United States Patent
Nagata et al.

(10) Patent No.: US 9,785,074 B2
(45) Date of Patent: Oct. 10, 2017

(54) POLYESTER RESIN FOR TONER, TONER, DEVELOPER, AND IMAGE FORMATION DEVICE

(71) Applicants: Kohsuke Nagata, Shizuoka (JP);
Shinya Nakayama, Shizuoka (JP);
Tsuyoshi Sugimoto, Shizuoka (JP);
Hiroshi Yamada, Shizuoka (JP);
Susumu Chiba, Shizuoka (JP);
Shinsuke Nagai, Shizuoka (JP);
Suzuka Amemori, Shizuoka (JP)

(72) Inventors: Kohsuke Nagata, Shizuoka (JP);
Shinya Nakayama, Shizuoka (JP);
Tsuyoshi Sugimoto, Shizuoka (JP);
Hiroshi Yamada, Shizuoka (JP);
Susumu Chiba, Shizuoka (JP);
Shinsuke Nagai, Shizuoka (JP);
Suzuka Amemori, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/116,478

(22) PCT Filed: Jan. 6, 2015

(86) PCT No.: PCT/JP2015/050110
§ 371 (c)(1),
(2) Date: Aug. 3, 2016

(87) PCT Pub. No.: WO2015/118893
PCT Pub. Date: Aug. 13, 2015

(65) Prior Publication Data
US 2017/0010550 A1   Jan. 12, 2017

(30) Foreign Application Priority Data

Feb. 4, 2014 (JP) .................................. 2014-019432

(51) Int. Cl.
*G03G 9/08*        (2006.01)
*G03G 9/087*       (2006.01)
(Continued)

(52) U.S. Cl.
CPC ......... *G03G 9/08755* (2013.01); *C08G 63/12* (2013.01); *C08G 63/133* (2013.01);
(Continued)

(58) Field of Classification Search
CPC ... G03G 9/08755; C08G 63/12; C08G 63/133
See application file for complete search history.

(56) References Cited

U.S. PATENT DOCUMENTS 4,833,057 A   5/1989 Misawa et al.
5,486,444 A   1/1996 Bayley et al.
(Continued)

FOREIGN PATENT DOCUMENTS

CN   87 1 01835 A   12/1987
EP   1 542 084 A1   6/2005
(Continued)

OTHER PUBLICATIONS

Extended European Search Report issued Dec. 22, 2016 in European Patent Application No. 15746972.7.
(Continued)

*Primary Examiner* — Mark A Chapman
(74) *Attorney, Agent, or Firm* — Oblon, McClelland, Maier & Neustadt, L.L.P.

(57) ABSTRACT

A polyester resin for a toner, the polyester resin including:
a segment derived from an alcohol component; and
a segment derived from a carboxylic acid component,
wherein the alcohol component includes a trivalent or higher aliphatic alcohol, and
(Continued)

wherein the polyester resin satisfies Expressions (1) to (3) below:

$$500 \leq \frac{\text{Weight average molecular weight } (Mw)}{\begin{pmatrix} \text{Valence of the trivalent or} \\ \text{higher aliphatic alcohol} \end{pmatrix} \times \begin{pmatrix} \text{Amount of the trivalent or} \\ \text{higher aliphatic alcohol} \end{pmatrix}} \leq 4{,}000; \quad \text{Expression (1)}$$

$$4{,}000 \leq \text{Weight average molecular weight } (Mw) \leq 25{,}000 \quad \text{Expression (2); and}$$

$$0.5 \leq (\text{Amount of the trivalent or higher aliphatic alcohol}) \leq 6.5 \quad \text{Expression (3),}$$

where, in the Expressions (1) and (3), the Amount of the trivalent or higher aliphatic alcohol denotes a percent by mole of the trivalent or higher aliphatic alcohol relative to the alcohol component.

12 Claims, 3 Drawing Sheets

(51) Int. Cl.
  *C08G 63/12* (2006.01)
  *C08G 63/133* (2006.01)
  *G03G 15/08* (2006.01)

(52) U.S. Cl.
  CPC ..... *G03G 9/08793* (2013.01); *G03G 9/08795* (2013.01); *G03G 9/08797* (2013.01); *G03G 15/08* (2013.01)

(56) References Cited

U.S. PATENT DOCUMENTS

| | | |
|---|---|---|
| 7,374,851 B2 | 5/2008 | Nakayama et al. |
| 8,673,528 B2 | 3/2014 | Sugimoto et al. |
| 2005/0112488 A1 | 5/2005 | Yamada et al. |
| 2006/0167214 A1 | 7/2006 | Terauchi et al. |
| 2006/0177756 A1 | 8/2006 | Sugimoto et al. |
| 2008/0026311 A1 | 1/2008 | Mizuhata et al. |
| 2008/0070151 A1 | 3/2008 | Sugimoto et al. |
| 2008/0118855 A1 | 5/2008 | Nakayama et al. |
| 2008/0233498 A1 | 9/2008 | Yamada et al. |
| 2008/0261131 A1 | 10/2008 | Nakayama et al. |
| 2008/0268366 A1 | 10/2008 | Nakayama et al. |
| 2008/0280219 A1 | 11/2008 | Nakayama et al. |
| 2008/0318143 A1 | 12/2008 | Nakayama et al. |
| 2008/0318148 A1 | 12/2008 | Sugimoto et al. |
| 2009/0092917 A1 | 4/2009 | Sugimoto et al. |
| 2009/0214973 A1 | 8/2009 | Sugimoto et al. |
| 2010/0035170 A1 | 2/2010 | Sugimoto et al. |
| 2010/0316947 A1 | 12/2010 | Mizuhata et al. |
| 2012/0282000 A1 | 11/2012 | Nakayama et al. |
| 2012/0295193 A1 | 11/2012 | Hanatani et al. |
| 2013/0045442 A1 | 2/2013 | Moriya et al. |
| 2013/0065172 A1 | 3/2013 | Moriya et al. |
| 2013/0078563 A1 | 3/2013 | Nakayama et al. |
| 2013/0095422 A1 | 4/2013 | Yamamoto et al. |
| 2013/0108950 A1 | 5/2013 | Yamamoto et al. |
| 2013/0115550 A1 | 5/2013 | Amemori et al. |
| 2013/0143155 A1 | 6/2013 | Santo et al. |
| 2013/0149642 A1 | 6/2013 | Sabu et al. |
| 2013/0157183 A1 | 6/2013 | Santo et al. |
| 2013/0157185 A1 | 6/2013 | Sakashita et al. |
| 2013/0157193 A1 | 6/2013 | Moritani et al. |
| 2013/0171550 A1 | 7/2013 | Amemori et al. |
| 2013/0202996 A1 | 8/2013 | Yamauchi et al. |
| 2013/0236826 A1 | 9/2013 | Makabe et al. |
| 2013/0244011 A1 | 9/2013 | Sabu et al. |
| 2013/0244153 A1 | 9/2013 | Nakayama et al. |
| 2013/0244154 A1 | 9/2013 | Yamamoto et al. |
| 2013/0244166 A1 | 9/2013 | Yamazaki et al. |
| 2013/0244167 A1 | 9/2013 | Yamashita et al. |
| 2013/0244168 A1 | 9/2013 | Yamashita et al. |
| 2013/0252158 A1 | 9/2013 | Yamada et al. |
| 2013/0260298 A1 | 10/2013 | Amemori et al. |
| 2013/0337374 A1 | 12/2013 | Sugimoto et al. |
| 2014/0023965 A1 | 1/2014 | Chiba et al. |
| 2014/0051019 A1 | 2/2014 | Sekiguchi et al. |
| 2014/0065534 A1 | 3/2014 | Amemori et al. |
| 2014/0080046 A1 | 3/2014 | Asahina et al. |
| 2014/0080050 A1 | 3/2014 | Asahina et al. |
| 2014/0242514 A1 | 8/2014 | Inoue et al. |
| 2014/0270874 A1 | 9/2014 | Hase et al. |
| 2014/0272689 A1 | 9/2014 | Yamashita et al. |
| 2014/0272695 A1 | 9/2014 | Moritani et al. |
| 2014/0272698 A1 | 9/2014 | Yamada et al. |
| 2014/0275412 A1 | 9/2014 | Ogawa et al. |
| 2014/0301757 A1 | 10/2014 | Sakashita et al. |
| 2014/0342283 A1 | 11/2014 | Yamamoto et al. |

FOREIGN PATENT DOCUMENTS

| | | |
|---|---|---|
| JP | 04-040470 | 2/1992 |
| JP | 2579150 | 11/1996 |
| JP | 09-152742 | 6/1997 |
| JP | 09-152743 | 6/1997 |
| JP | 09-302075 | 11/1997 |
| JP | 10-123756 | 5/1998 |
| JP | 11-60703 | 3/1999 |
| JP | 11-133665 | 5/1999 |
| JP | 2001-158819 | 6/2001 |
| JP | 2002-287400 | 10/2002 |
| JP | 2002-351143 | 12/2002 |
| JP | 2004-046095 | 2/2004 |
| JP | 2006-091124 | 4/2006 |
| JP | 2007-271789 | 10/2007 |
| JP | 2008-015037 | 1/2008 |
| JP | 2009-223281 | 10/2009 |
| JP | 2012-150467 | 8/2012 |
| WO | WO87/04811 A1 | 8/1987 |
| WO | WO2013/058279 A1 | 4/2013 |

OTHER PUBLICATIONS

Combined Search Report and Office Action issued Apr. 1, 2017 in Chinese Patent Application No. 201580015599.9 (with English translation).

International Search Report Issued Apr. 21, 2015 in PCT/JP2015/050110 filed Jan. 6, 2015.

POLYESTER RESIN FOR TONER, TONER, DEVELOPER, AND IMAGE FORMATION DEVICE

TECHNICAL FIELD

The present invention relates to a polyester resin for a toner, a toner, a developer, and an image forming apparatus.

BACKGROUND ART

In recent years, toners have been required to have the following properties: i.e., a smaller particle diameter and hot offset resistance for giving higher quality to output images; low-temperature fixing ability for energy saving; and heat-resistant storage stability for resisting a high-temperature, high-humidity environment during storage or transportation after production. In particular, improvement in the low-temperature fixing ability is very important because power consumption for fixing occupies a large part of power consumption for the entire image forming process.

Hitherto, toners produced by a kneading and pulverizing method have been used. The toners produced by the kneading and pulverizing method have the following problems: their particle diameter is difficult to reduce; their amorphous shape and broad particle diameter distribution result in unsatisfactory quality of output images; and a large quantity of energy is required for fixing. When a wax (i.e., a release agent) is added to the toner in the kneading and pulverizing method for the purpose of improving a fixing ability, a large amount of the wax is present on toner surfaces because the kneaded product is cracked at an interface with the wax during pulverization. As a result, although a release effect is exhibited, the toner tends to deposit on a carrier, a photoconductor, and a blade (i.e., filming). Therefore, there is a problem that the toner is unsatisfactory from the viewpoint of entire performance.

In order to overcome the above-described problems associated with the kneading and pulverizing method, there has been proposed a method for producing a toner by a polymerization method. The toner produced by the polymerization method can be easily made to have a smaller particle diameter, can have a sharper particle size distribution than the toner produced by the pulverizing method, and can encapsulate a release agent. As the method for producing a toner by the polymerization method, there has been proposed a method for producing a toner using an elongation reaction product of urethane-modified polyester as a toner binder, for the purpose of improving the low-temperature fixing ability and the hot offset resistance (see, for example, Patent document 1).

Moreover, there has been proposed a method for producing a toner which is excellent in all of the heat-resistant storage stability, the low-temperature fixing ability, and the hot offset resistance, as well as excellent in powder flowability and transfer ability when the toner has a small particle diameter (see, for example, Patent documents 2 and 3).

Furthermore, there has been proposed a method for producing a toner, the method including an aging step for the purpose of producing a toner binder having a stable molecular weight distribution and achieving both of the low-temperature fixing ability and the hot offset resistance (see, for example, Patent documents 4 and 5).

However, these proposed techniques are unsatisfactory from the viewpoint of achieving high-level, low-temperature fixing ability which has been required in recent years.

For the purpose of achieving the low-temperature fixing ability at a high level, there has been proposed a toner which includes a wax and a resin including a crystalline polyester resin and has a sea-island, phase-separated structure due to incompatibility between the resin and the wax (see, for example, Patent document 6).

Moreover, there has been proposed a toner containing a crystalline polyester resin, a release agent, and a graft polymer (see, for example, Patent document 7).

These proposed techniques can achieve low temperature fixing because the crystalline polyester resin more rapidly melts than a non-crystalline polyester resin. Although the resultant toners can have both of the low-temperature fixing ability and the heat-resistant storage stability, there is a problem that, when the toner is used in high-speed apparatuses, stress applied to the toner in a developing device is increased to cause formation of toner aggregates and clogging of a cleaning doctor, resulting in white voids (white voids after transfer) of the toner on output toner images. Moreover, toners containing a crystalline polyester resin have a problem with formation of toner aggregates under a high-temperature, high-humidity environment.

Furthermore, in recent years, due to a demand for higher quality, there is a need for a toner being excellent in image gloss.

Accordingly, there is a need for provision of a polyester resin for a toner capable of forming a toner that achieves satisfactory low-temperature fixing ability and satisfactory high-temperature, high-humidity resistant storage stability at the same time, prevents white voids after transfer from occurring, and forms toner images excellent in blocking resistance and image gloss.

CITATION LIST

Patent Document

Patent document 1: Japanese Unexamined Patent Application Publication No. 11-133665
Patent document 2: Japanese Unexamined Patent Application Publication No. 2002-287400
Patent document 3: Japanese Unexamined Patent Application Publication No. 2002-351143
Patent document 4: Japanese Patent No. 2579150
Patent document 5: Japanese Unexamined Patent Application Publication No. 2001-158819
Patent document 6: Japanese Unexamined Patent Application Publication No. 2004-46095
Patent document 7: Japanese Unexamined Patent Application Publication No. 2007-271789

SUMMARY OF THE INVENTION

Technical Problem

The present invention aims to solve the above existing problems and achieve the following object. That is, the present invention has an object to provide a polyester resin for a toner capable of forming a toner that achieves satisfactory low-temperature fixing ability and satisfactory high-temperature, high-humidity resistant storage stability at the same time, prevents white voids after transfer from occurring, and forms toner images excellent in blocking resistance and image gloss.

Solution to Problem

Means for Solving the Above Problems is as Follows

A polyester resin for a toner of the present invention includes a segment derived from an alcohol component and a segment derived from a carboxylic acid component. The alcohol component includes a trivalent or higher aliphatic alcohol. The polyester resin for a toner satisfies Expressions (1) to (3) below:

$$500 \leq \frac{\text{Weight average molecular weight } (Mw)}{\left(\begin{array}{c}\text{Valence of the trivalent or}\\ \text{higher aliphatic alcohol}\end{array}\right) \times \left(\begin{array}{c}\text{Amount of the trivalent or}\\ \text{higher aliphatic alcohol}\end{array}\right)} \leq 4{,}000; \quad \text{Expression (1)}$$

$$4{,}000 \leq \text{Weight average molecular weight } (Mw) \leq 25{,}000 \quad \text{Expression (2); and}$$

$$0.5 \leq (\text{Amount of the trivalent or higher aliphatic alcohol}) \leq 6.5 \quad \text{Expression (3)}.$$

In the Expressions (1) and (3), the Amount of the trivalent or higher aliphatic alcohol denotes a percent by mole of the trivalent or higher aliphatic alcohol relative to the alcohol component.

Effects of the Invention

The present invention can solve the above existing problems and provide a polyester resin for a toner capable of forming a toner that achieves a satisfactory low-temperature fixing ability and a satisfactory high-temperature, high-humidity resistant storage stability at the same time, prevents white voids after transfer from occurring, and forms toner images excellent in blocking resistance and image gloss.

Figure 1:
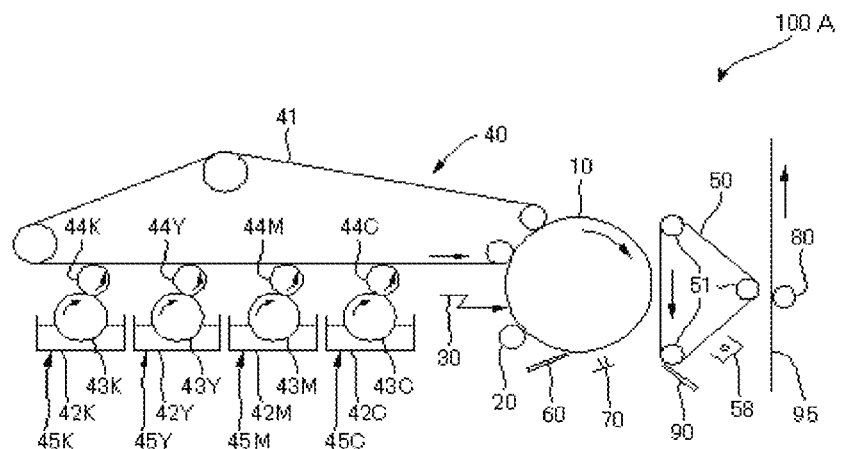
FIG. 1 is a schematic, configurational view illustrating one exemplary image forming apparatus according to the present invention.

MODE FOR CARRYING OUT THE INVENTION (Polyester Resin for Toner)

A polyester resin for a toner of the present invention includes a segment derived from an alcohol component and a segment derived from a carboxylic acid component.

The alcohol component includes a trivalent or higher aliphatic alcohol.

The polyester resin for a toner satisfies Expressions (1) to (3) below:

$$500 \leq \frac{\text{Weight average molecular weight } (Mw)}{\left(\begin{array}{c}\text{Valence of the trivalent or}\\ \text{higher aliphatic alcohol}\end{array}\right) \times \left(\begin{array}{c}\text{Amount of the trivalent or}\\ \text{higher aliphatic alcohol}\end{array}\right)} \leq 4{,}000; \quad \text{Expression (1)}$$

$$4{,}000 \leq \text{Weight average molecular weight } (Mw) \leq 25{,}000 \quad \text{Expression (2); and}$$

$$0.5 \leq (\text{Amount of the trivalent or higher aliphatic alcohol}) \leq 6.5 \quad \text{Expression (3)}.$$

In the Expressions (1) and (3), the Amount of the trivalent or higher aliphatic alcohol (hereinafter may be referred to as "Amount of a branched component") denotes a percent by mole of the trivalent or higher aliphatic alcohol relative to the alcohol component.

When two or more kinds of the trivalent or higher aliphatic alcohols are contained in the alcohol component, the "Valence of the trivalent or higher aliphatic alcohol" denotes an average valence determined from molar fractions of the trivalent or higher aliphatic alcohols. For example, the trivalent or higher aliphatic alcohol includes 50 mol % of a trivalent aliphatic alcohol and 50 mol % of a tetravalent aliphatic alcohol, the "Valence of the trivalent or higher aliphatic alcohol" is determined as follows: 3×0.5+4×0.5=3.5. Meanwhile, for example, the trivalent or higher aliphatic alcohol includes 60 mol % of a trivalent aliphatic alcohol and 40 mol % of a hexavalent aliphatic alcohol, the "Valence of the trivalent or higher aliphatic alcohol" is determined as follows: 3×0.6+6×0.4=4.2.

The polyester resin for a toner satisfies the Expressions (1) to (3), so that the resultant toner can be improved in low-temperature fixing ability, stress resistance, and blocking resistance of the resultant toner images.

The following part of the Expression (1) denotes an average distance between branches of a polyester resin (hereinafter may be referred to as "interbranch distance").

$$\frac{\text{Weight average molecular weight } (Mw)}{\left(\begin{array}{c}\text{Valence of the trivalent or}\\ \text{higher aliphatic alcohol}\end{array}\right) \times \left(\begin{array}{c}\text{Amount of the trivalent or}\\ \text{higher aliphatic alcohol}\end{array}\right)}$$

The polyester resin for a toner satisfies the Expression (1) and preferably satisfies Expression (1-1) below:

$$800 \leq \frac{\text{Weight average molecular weight } (Mw)}{\left(\begin{array}{c}\text{Valence of the trivalent or}\\ \text{higher aliphatic alcohol}\end{array}\right) \times \left(\begin{array}{c}\text{Amount of the trivalent or}\\ \text{higher aliphatic alcohol}\end{array}\right)} \leq 2{,}000. \quad \text{Expression (1-1)}$$

In the Expression (1-1), the Amount of the trivalent or higher aliphatic alcohol denotes a percent by mole of the trivalent or higher aliphatic alcohol relative to the alcohol component.

When the interbranch distance is more than 4,000, a melt viscosity is hardly decreased, which is disadvantageous in terms of the low-temperature fixing ability. When the interbranch distance is less than 500, the resultant toner is lowered in stress resistance because a molecular size decreases as the interbranch distance becomes shorter. Additionally, molecular entanglement is more slowly initiated upon cooling from a high-temperature state, leading to a lower blocking resistance of output toner images.

A polyester resin having a branched structure can be decreased in the melt viscosity in a high-temperature region while maintaining a glass transition temperature, making it possible to improve the low-temperature fixing ability and the heat-resistant storage stability. Meanwhile, the polyester resin has a dense three-dimensional structure portion due to an increase of an amount of branched components in the polyester resin. As a result, the polyester resin can be prevented from being deformed even when large stress is applied to the polyester resin. It is believed that this is why the resultant toner is excellent in the stress resistance.

A weight average molecular weight of the polyester resin for a toner satisfies the Expression (2) and preferably satisfies Expression (2-1) below:

$$8,000 \leq \text{Weight average molecular weight (Mw)} \leq 20,000 \quad \text{Expression (2-1)}.$$

When the weight average molecular weight of the polyester resin for a toner is less than 4,000, the resultant toner is deteriorated in the high-temperature, high-humidity resistant storage stability and the stress resistance. When the weight average molecular weight of the polyester resin for a toner is more than 30,000, the melt viscosity is excessively increased, so that the resultant toner cannot exhibit the low-temperature fixing ability.

The polyester resin for a toner satisfies the Expression (3) and preferably satisfies Expression (3-1) below.

$$2.0 \leq (\text{Amount of the trivalent or higher aliphatic alcohol}) \leq 4.0 \quad \text{Expression (3-1)}$$

In the Expression (3-1), the Amount of the trivalent or higher aliphatic alcohol denotes a percent by mole of the trivalent or higher aliphatic alcohol relative to the alcohol component.

When the "Amount of the trivalent or higher aliphatic alcohol" (Amount of a branched component) is less than 0.5 mol %, the resultant toner is deteriorated in the high-temperature, high-humidity resistant storage stability and filming resistance. When the Amount of a branched component is more than 6.5 mol %, the resultant toner is deteriorated in image gloss and low-temperature fixing ability.

A method for producing the polyester resin for a toner is preferably a method in which an alcohol component including a trivalent or higher aliphatic alcohol is allowed to react with a carboxylic acid component. Thus, a polyester resin having a branched structure can be formed.

A glass transition temperature of the polyester resin for a toner is not particularly limited and may be appropriately selected depending on the intended purpose, but is preferably from 30° C. through 80° C., more preferably from 40° C. through 70° C. When the glass transition temperature is less than 30° C., the resultant toner is deteriorated in storage stability, potentially leading to aggregation of the toner. When the glass transition temperature is more than 80° C., the polyester resin is increased in the melt viscosity, so that the resultant toner may exhibit an unsatisfactory low-temperature fixing ability.

<Alcohol Component>

Examples of the alcohol component include divalent alcohols and trivalent or higher alcohols.

The alcohol component includes a trivalent or higher aliphatic alcohol.

Examples of the divalent alcohols include aliphatic diols, diols including an oxyalkylene group, alicyclic diols, adducts of alicyclic diols with alkylene oxides (e.g., ethylene oxide, propylene oxide, and butylene oxide), bisphenols, and adducts of bisphenols with alkylene oxides.

Examples of the aliphatic diols include ethylene glycol, 1,2-propylene glycol, 1,3-propylene glycol, 1,4-butanediol, 3-methyl-1,5-pentanediol, 1,6-hexanediol, 1,8-octanediol, 1,10-decanediol, and 1,12-dodecanediol.

Examples of the diols including an oxyalkylene group include diethylene glycol, triethylene glycol, dipropylene glycol, polyethylene glycol, polypropylene glycol, and polytetramethylene glycol.

Examples of the alicyclic diols include 1,4-cyclohexanedimethanol and hydrogenated bisphenol A.

Examples of the bisphenols include bisphenol A, bisphenol F, and bisphenol S.

Examples of the adducts of bisphenols with alkylene oxides include adducts of bisphenols with alkylene oxides such as ethylene oxide, propylene oxide, and butylene oxide.

Examples of the trivalent or higher alcohols include the trivalent or higher aliphatic alcohols.

Examples of the trivalent or higher aliphatic alcohols include glycerin, trimethylolethane, trimethylolpropane, pentaerythritol, sorbitol, and dip entaerythritol.

The trivalent or higher aliphatic alcohols are preferably trivalent or tetravalent aliphatic alcohols.

<Carboxylic Acid Component>

Examples of the carboxylic acid component include divalent carboxylic acids and trivalent or higher carboxylic acids. Anhydrides, esterified products with lower alkyls (i.e., alkyls having from 1 through 3 carbon atoms), or halides of the divalent carboxylic acids or the trivalent or higher carboxylic acids may also be used.

Examples of the divalent carboxylic acids include aliphatic dicarboxylic acids and aromatic dicarboxylic acids.

The aliphatic dicarboxylic acids are not particularly limited and may be appropriately selected depending on the intended purpose. Examples of the aliphatic dicarboxylic acids include succinic acid, adipic acid, sebacic acid, decanedioic acid, maleic acid, and fumaric acid.

The aromatic dicarboxylic acids are not particularly limited and may be appropriately selected depending on the intended purpose. Examples of the aromatic dicarboxylic acids include phthalic acid, isophthalic acid, terephthalic acid, and naphthalene dicarboxylic acids.

Examples of the trivalent or higher carboxylic acids include trimellitic acid and pyromellitic acid.

These carboxylic acid components may be used alone or in combination.

(Toner)

A toner of the present invention includes at least the polyester resin for a toner (hereinafter may be referred to as "first polyester resin") of the present invention, preferably includes a second polyester resin; and, if necessary, further includes other components.

A glass transition temperature [Tg1st (toner)] of the toner at the first heating in differential scanning calorimetry (DSC) is not particularly limited and may be appropriately selected depending on the intended purpose, but is preferably 20° C. or more but 50° C. or less.

A glass transition temperature [Tg2nd (toner)] of the toner at the second heating in differential scanning calorimetry (DSC) is not particularly limited and may be appropriately selected depending on the intended purpose, but is preferably 5° C. or more but 35° C. or less.

If the glass transition temperature (Tg) of a toner known in the art is lowered to be about 50° C. or lower, the toner tends to aggregate to each other due to a change in temperature during transportation or storage of the toner under conditions assuming summer or a tropical region. As a result, the toner is solidified in a toner bottle and adhered inside a developing device. Moreover, supply failures due to clogging of the toner in the toner bottle and formation of defected images due to toner adherence within the developing device are likely to occur.

When the second polyester resin, which is a low Tg component in the toner, is non-linear, the toner of the present invention can maintain the heat-resistant storage stability even when the toner of the present invention has a lower Tg than toners known in the art. Especially in the case where the second polyester resin has a urethane or urea bond having high cohesive force, the toner of the present invention more significantly exhibits an effect of maintaining the heat-resistant storage stability.

When the [Tg1st (toner)] is less than 20° C., the heat-resistant storage stability may be deteriorated or blocking within a developing device and filming on a photoconductor may occur. When the [Tg1st (toner)] is more than 50° C., the resultant toner may be lowered in low-temperature fixing ability.

The toner preferably includes a tetrahydrofuran (THF) insoluble matter.

The THF insoluble matter preferably includes the second polyester resin.

Note that, the second polyester resin is different from the polyester resin for a toner (the first polyester resin).

An amount of the first polyester resin is not particularly limited and may be appropriately selected depending on the intended purpose, but is preferably from 40 parts by mass through 70 parts by mass, more preferably from 45 parts by mass through 65 parts by mass, relative to 100 parts by mass of the toner. When the amount is less than 40 parts by mass, the resultant toner may be deteriorated in the heat-resistant storage stability and the stress resistance. When the amount is more than 70 parts by mass, the resultant toner may be deteriorated in the low-temperature fixing ability. The amount falling within the more preferable range is advantageous in terms of improvements in the low-temperature fixing ability, the heat-resistant storage stability, and the stress resistance.

<Second Polyester Resin>

The second polyester resin is not particularly limited and may be appropriately selected depending on the intended purpose, so long as the second polyester resin is different from the polyester resin for a toner.

The second polyester resin includes, as constituting components, a diol component and a dicarboxylic acid component, and preferably includes a cross-linking component.

The component of the second polyester resin preferably includes the diol component and the cross-linking component.

The diol component preferably includes 50 mol % or more of an aliphatic diol having from 3 through 10 carbon atoms.

The cross-linking component preferably includes at least one of a trivalent or higher carboxylic acid and a trivalent or higher alcohol, more preferably includes the trivalent or higher alcohol, and particularly preferably includes a trivalent or higher aliphatic alcohol.

The second polyester resin preferably includes at least one of a urethane bond and a urea bond and more preferably contains both the urethane bond and the urea bond, from the viewpoint of realizing more excellent adhesion onto recording media such as paper. When the second polyester resin includes at least one of the urethane bond and the urea bond, the urethane bond or the urea bond behaves like a pseudo-branched point to enhance a rubber-like property of the second polyester resin, leading to more excellent heat-resistant storage stability and more excellent hot offset resistance of the toner.

—Reactive Precursor—

The second polyester resin is preferably obtained from a reaction between a reactive precursor and a curing agent.

The reactive precursor is not particularly limited and may be appropriately selected depending on the intended purpose, so long as the reactive precursor is a polyester resin having a group reactive with the curing agent (hereinafter may be referred to as "prepolymer").

Examples of the group reactive with the curing agent in the prepolymer include groups reactive with an active hydrogen group. Examples of the groups reactive with an active hydrogen group include an isocyanate group, an epoxy group, a carboxylic acid group, and an acid chloride group. Among them, an isocyanate group is preferable because a urethane bond or a urea bond can be introduced into the second polyester resin.

The prepolymer is preferably non-linear. The non-linear refers to having a branched structure provided by at least one of the trivalent or higher alcohol and the trivalent or higher carboxylic acid.

The prepolymer is preferably a polyester resin containing an isocyanate group.

——Polyester Resin Containing Isocyanate Group——

The polyester resin containing an isocyanate group is not particularly limited and may be appropriately selected depending on the intended purpose. Examples of the polyester resin containing an isocyanate group include a reaction product between a polyester resin containing an active hydrogen group and a polyisocyanate. The polyester resin containing an active hydrogen group can be obtained, for example, through polycondensation among the diol component, the dicarboxylic acid component, and at least one of the trivalent or higher alcohol and the trivalent or higher carboxylic acid. The trivalent or higher alcohol and the trivalent or higher carboxylic acid give the branched structure to the polyester resin containing an isocyanate group.

———Diol Component———

Examples of the diol component include aliphatic diols, diols containing an oxyalkylene group, alicyclic diols, adducts of alicyclic diols with alkylene oxides (e.g., ethylene oxide, propylene oxide, and butylene oxide), bisphenols, and adducts of bisphenols with alkylene oxides.

Examples of the aliphatic diols include ethylene glycol, 1,2-propylene glycol, 1,3-propylene glycol, 1,4-butanediol, 3-methyl-1,5-pentanediol, 1,6-hexanediol, 1,8-octanediol, 1,10-decanediol, and 1,12-dodecanediol.

Examples of the diols containing an oxyalkylene group include diethylene glycol, triethylene glycol, dipropylene glycol, polyethylene glycol, polypropylene glycol, and polytetramethylene glycol.

Examples of the alicyclic diols include 1,4-cyclohexanedimethanol and hydrogenated bisphenol A.

Examples of the bisphenols include bisphenol A, bisphenol F, and bisphenol S.

Examples of the adducts of bisphenols with alkylene oxides include adducts of bisphenols with alkylene oxides such as ethylene oxide, propylene oxide, and butylene oxide.

———Dicarboxylic Acid Component———

Examples of the dicarboxylic acid component include aliphatic dicarboxylic acids and aromatic dicarboxylic acids. Anhydrides, esterified products with lower alkyls (i.e., alkyls having from 1 through 3 carbon atoms), or halides of the aliphatic dicarboxylic acids and the aromatic dicarboxylic acids may also be used.

The aliphatic dicarboxylic acids are not particularly limited and may be appropriately selected depending on the intended purpose. Examples of the aliphatic dicarboxylic acids include succinic acid, adipic acid, sebacic acid, dodecane diacid, maleic acid, and fumaric acid.

The aromatic dicarboxylic acids are not particularly limited and may be appropriately selected depending on the intended purpose. Examples of the aromatic dicarboxylic acids include phthalic acid, isophthalic acid, terephthalic acid, and naphthalene dicarboxylic acids.

———Trivalent or Higher Alcohol———

Examples of the trivalent or higher alcohols include the trivalent or higher aliphatic alcohols.

Additional examples of the trivalent or higher alcohols include trivalent or tetravalent alcohols.

The trivalent or higher aliphatic alcohols are preferably trivalent or tetravalent aliphatic alcohols from the viewpoints of the low-temperature fixing ability, the high-temperature, high-humidity resistant storage stability, and the stress resistance.

The trivalent or tetravalent aliphatic alcohols are not particularly limited and may be appropriately selected depending on the intended purpose. Examples of the trivalent or tetravalent aliphatic alcohols include glycerin, trimethylolethane, trimethylolpropane, and pentaerythritol.

———Trivalent or Higher Carboxylic Acid———

Examples of the trivalent or higher carboxylic acids include trivalent or tetravalent carboxylic acids. Examples of the trivalent or tetravalent carboxylic acids include trimellitic acid and pyromellitic acid.

The second polyester resin including, as a constituting component, the trivalent or higher carboxylic acid or the trivalent or higher alcohol exhibits rubber-like elasticity and is more excellent in the blocking resistance. In addition, the second polyester resin can exhibit the rubber-like elasticity while maintaining high thermal deformability of the resin in a fixable temperature range, so that the resultant toner is more excellent in the low-temperature fixing ability and the blocking resistance.

Among the trivalent or tetravalent carboxylic acids and the trivalent or tetravalent alcohols, the trivalent or tetravalent alcohols are preferable from the viewpoint of being more excellent in the low-temperature fixing ability.

———Polyisocyanate———

The polyisocyanate is not particularly limited and may be appropriately selected depending on the intended purpose. Examples of the polyisocyanate include diisocyanates and trivalent or higher isocyanates.

Examples of the diisocyanates include aliphatic diisocyanates, alicyclic diisocyanates, aromatic diisocyanates, aromatic aliphatic diisocyanates, isocyanurates, and blocked products of the above-listed diisocyanates with, for example, phenol derivatives, oximes, or caprolactams.

The aliphatic diisocyanates are not particularly limited and may be appropriately selected depending on the intended purpose. Examples of the aliphatic diisocyanates include tetramethylene diisocyanate, hexamethylene diisocyanate, methyl 2,6-diisocyanatocaproate, octamethylene diisocyanate, decamethylene diisocyanate, dodecamethylene diisocyanate, tetradecamethylene diisocyanate, trimethylhexane diisocyanate, and tetramethylhexane diisocyanate.

The alicyclic diisocyanates are not particularly limited and may be appropriately selected depending on the intended purpose. Examples of the alicyclic diisocyanates include isophorone diisocyanate and cyclohexylmethane diisocyanate.

The aromatic diisocyanates are not particularly limited and may be appropriately selected depending on the intended purpose. Examples of the aromatic diisocyanates include tolylene diisocyanate, diisocyanatodiphenylmethane, 1,5-nephthylene diisocyanate, 4,4'-diisocyanatodiphenyl, 4,4'-diisocyanato-3,3'-dimethyldiphenyl, 4,4'-diisocyanato-3-methyldiphenylmethane, and 4,4'-diisocyanatodiphenyl ether.

The aromatic aliphatic diisocyanates are not particularly limited and may be appropriately selected depending on the intended purpose. Examples of the aromatic aliphatic diisocyanates include $\alpha,\alpha,\alpha',\alpha'$-tetramethylxylene diisocyanate.

The isocyanurates are not particularly limited and may be appropriately selected depending on the intended purpose. Examples of the isocyanurates include tris(isocyanatoalkyl) isocyanurate and tris(isocyanatocycloalkyl)isocyanurate.

These polyisocyanates may be used alone or in combination.

—Curing Agent—

The curing agent is not particularly limited and may be appropriately selected depending on the intended purpose, so long as the curing agent can react with the prepolymer. Examples of the curing agent include active-hydrogen-group containing compounds.

———Active-Hydrogen-Group Containing Compound———

An active hydrogen group in the active-hydrogen-group containing compound is not particularly limited and may be appropriately selected depending on the intended purpose. Examples of the active hydrogen group include a hydroxyl group (e.g., an alcoholic hydroxyl group and a phenolic hydroxyl group), an amino group, a carboxyl group, and a mercapto group. These active hydrogen groups may be used alone or in combination.

The active-hydrogen-group containing compound is not particularly limited and may be appropriately selected depending on the intended purpose, but is preferably an amine because the amine can form a urea bond.

The amine is not particularly limited and may be appropriately selected depending on the intended purpose. Examples of the amine include diamines, trivalent or higher amines, amino alcohols, amino mercaptans, amino acids, and compounds in which the amino group in the above-listed amines is blocked. These amines may be used alone or in combination.

Among them, diamines and mixtures of diamines and a small amount of trivalent or higher amines are preferable.

The diamines are not particularly limited and may be appropriately selected depending on the intended purpose. Examples of the diamines include aromatic diamines, alicyclic diamines, and aliphatic diamines. The aromatic diamines are not particularly limited and may be appropriately selected depending on the intended purpose. Examples of the aromatic diamines include phenylenediamine, diethyl toluene diamine, and 4,4'-diaminodiphenylmethane. The alicyclic diamines are not particularly limited and may be appropriately selected depending on the intended purpose. Examples of the alicyclic diamines include 4,4'-diamino-3,3'-dimethyldicyclohexyl methane, diaminocyclohexane, and isophoronediamine. The aliphatic diamines are not particularly limited and may be appropriately selected depending on the intended purpose. Examples of the aliphatic diamines include ethylene diamine, tetramethylenediamine, and hexamethylenediamine.

The trivalent or higher amines are not particularly limited and may be appropriately selected depending on the intended purpose. Examples of the trivalent or higher amines include diethylenetriamine and triethylenetetramine.

The amino alcohols are not particularly limited and may be appropriately selected depending on the intended purpose. Examples of the amino alcohols include ethanol amine and hydroxyethyl aniline.

The aminomercaptans are not particularly limited and may be appropriately selected depending on the intended purpose. Examples of the aminomercaptans include aminoethyl mercaptan and aminopropyl mercaptan.

The amino acids are not particularly limited and may be appropriately selected depending on the intended purpose. Examples of the amino acids include aminopropionic acid and aminocaproic acid.

The compounds containing a blocked amino group are not particularly limited and may be appropriately selected depending on the intended purpose. Examples of the compounds include ketimine compounds in which the amino group is blocked with ketones (e.g., acetone, methyl ethyl ketone, and methyl isobutyl ketone) and oxazoline compounds.

A molecular structure of the second polyester resin can be identified by solution-state or solid-state NMR, X-ray diffraction, GC/MS, LC/MS, or IR spectroscopy. In one employable convenient method, one having no absorption based on δCH (out-of-plane bending vibration) of olefin at $965\pm10$ $cm^{-1}$ and $990\pm10$ $cm^{-1}$ in an infrared absorption spectrum is detected as the second polyester resin.

An amount of the second polyester resin is not particularly limited and may be appropriately selected depending on the intended purpose, but is preferably from 5 parts by mass through 25 parts by mass, more preferably from 10 parts by mass through 20 parts by mass, relative to 100 parts by mass of the toner. When the amount is less than 5 parts by mass, the resultant toner may be deteriorated in the low-temperature fixing ability and the hot offset resistance. When the amount is more than 25 parts by mass, the resultant toner may be deteriorated in the heat-resistant storage stability, and fixed images may be reduced in glossiness. The amount falling within the more preferable range is advantageous in that all of the low-temperature fixing ability, the hot offset resistance, and the blocking resistance are excellent.

<Other Components>

Examples of the other components include crystalline polyester resins, release agents, colorants, charge control agents, external additives, flowability improving agents, cleaning improving agents, and magnetic materials.

<<Crystalline Polyester Resin>>

The crystalline polyester resin, having high crystallinity, exhibits a thermofusion property in which viscosity rapidly decreases at a temperature around the fixing onset temperature. Use of the crystalline polyester resin having the above-described property in combination with the first polyester resin forms a toner that maintains excellent heat-resistant storage stability up to a temperature just below a melt onset temperature due to the crystallinity, but rapidly decreases in the viscosity at the melt onset temperature (sharp melt property) due to melting of the crystalline polyester resin. Along with the rapid decrease in the viscosity due to the melting, the crystalline polyester resin is homogeneously mixed with the first polyester resin. Thus, both the crystalline polyester resin and the first polyester resin rapidly decrease in the viscosity to be fixed. This makes it possible to obtain a toner being excellent in the heat-resistant storage stability and the low-temperature fixing ability. In addition, the toner gives an excellent result in terms of a releasable width (the difference between a lowest fixing temperature and a temperature at which the hot offset resistance occurs).

The crystalline polyester resin is obtained from a polyvalent alcohol and a polyvalent carboxylic acid or derivatives of the polyvalent carboxylic acid (e.g., polyvalent carboxylic acids, polyvalent carboxylic acid anhydrides, and polyvalent carboxylic acid esters).

Note that, in the present invention, the crystalline polyester resin refers to those obtained from a polyvalent alcohol and a polyvalent carboxylic acid or derivatives of the polyvalent carboxylic acid (e.g., polyvalent carboxylic acids, polyvalent carboxylic acid anhydrides, and polyvalent carboxylic acid esters), as described above. Modified polyester resins, for example, the prepolymer and resins obtained by allowing the prepolymer to undergo at least one of a cross-linking reaction and an elongation reaction do not belong to the crystalline polyester resin. The crystalline polyester resin is different from the first polyester resin or the second polyester resin.

—Polyvalent Alcohol—

The polyvalent alcohols are not particularly limited and may be appropriately selected depending on the intended purpose. Examples of the polyvalent alcohols include diols and trivalent or higher alcohols.

Examples of the diols include saturated aliphatic diols. Examples of the saturated aliphatic diols include straight-chain saturated aliphatic diols and branched-chain saturated aliphatic diols. Among them, straight-chain saturated aliphatic diols are preferable, and straight-chain saturated aliphatic diols having 2 or more but 12 or less carbon atoms are more preferable. When the saturated aliphatic diols are the branched-chain saturated aliphatic diols, the crystalline polyester resin may be decreased in the crystallinity and thus may be decreased in a melting point. When the number of carbon atoms in the saturated aliphatic diols is more than 12, such materials are practically difficult to obtain. The number of carbon atoms is, therefore, preferably 12 or less.

Examples of the saturated aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1, 11-undecanediol, 1, 12-dodecanediol, 1,13-tridecanediol, 1,14-tetradecanediol, 1,18-octadecanediol, and 1,14-eicosanedecanediol. Among them, ethylene glycol, 1,4-butanediol, 1,6-hexanediol, 1,8-octanediol, 1,10-decanediol, and 1,12-dodecanediol are preferable because the crystalline polyester resin has high crystallinity and excellent sharp melt property.

Examples of the trivalent or higher alcohols include glycerin, trimethylolethane, trimethylolpropane, and pentaerythritol.

These trivalent or higher alcohols may be used alone or in combination.

—Polyvalent Carboxylic Acid—

The polyvalent carboxylic acids are not particularly limited and may be appropriately selected depending on the intended purpose. Examples of the polyvalent carboxylic acids include divalent carboxylic acids and trivalent or higher carboxylic acids.

Examples of the divalent carboxylic acids include saturated aliphatic dicarboxylic acids, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; and aromatic dicarboxylic acids of dibasic acids, such as phthalic acid, isophthalic acid, terephthalic acid, naphthalene-2,6-dicarboxylic acid, malonic acid, and mesaconic acid. Anhydrides or esters with lower alkyls (i.e., alkyls having from 1 through 3 carbon atoms) of the above-listed divalent carboxylic acids may also be used.

Examples of the trivalent or higher carboxylic acids include 1,2,4-benzenetricarboxylic acid, 1,2,5-benzenetricarboxylic acid, 1,2,4-naphthalene tricarboxylic acid, anhydrides of the above-listed trivalent or higher carboxylic acids, and esters of the above-listed trivalent or higher carboxylic acids with lower alkyls (i.e., alkyls having from 1 through 3 carbon atoms).

The polyvalent carboxylic acid may include dicarboxylic acids containing a sulfonic acid group in addition to the saturated aliphatic dicarboxylic acids or the aromatic dicarboxylic acids. Moreover, the polyvalent carboxylic acid may include dicarboxylic acids containing a double bond in addition to the saturated aliphatic dicarboxylic acids or the aromatic dicarboxylic acids.

These dicarboxylic acids other than the saturated aliphatic dicarboxylic acids and the aromatic dicarboxylic acids may be used alone or in combination.

The crystalline polyester resin preferably includes straight-chain saturated aliphatic dicarboxylic acids having 4 or more but 12 or less carbon atoms and straight-chain saturated aliphatic diols having 2 or more but 12 or less carbon atoms.

That is, the crystalline polyester resin preferably contains a constituting unit derived from the saturated aliphatic dicarboxylic acids having 4 or more but 12 or less carbon atoms and a constituting unit derived from the saturated aliphatic diols having 2 or more but 12 or less carbon atoms. This is because the resultant toner has high crystallinity and excellent sharp melt property and thus is capable of exhibiting excellent low-temperature fixing ability.

The melting point of the crystalline polyester resin is not particularly limited and may be appropriately selected depending on the intended purpose, but is preferably 60° C. or more but 80° C. or less. When the melting point is less than 60° C., the crystalline polyester resin tends to melt at a low temperature, potentially leading to poor heat-resistant storage stability of the toner. When the melting point is more than 80° C., the crystalline polyester resin insufficiently melts with heat applied during fixing, potentially leading to poor low-temperature fixing ability of the toner.

A molecular weight of the crystalline polyester resin is not particularly limited and may be appropriately selected depending on the intended purpose. Although crystalline polyester resins having a sharp molecular weight distribution and a low molecular weight are excellent in the low-temperature fixing ability, toners containing a large amount of low-molecular-weight components have poor heat-resistant storage stability. In view of this, an o-dichlorobenzene soluble matter of the crystalline polyester resin preferably has a weight average molecular weight (Mw) of from 20,000 through 30,000, a number average molecular weight (Mn) of from 5,000 through 10,000, and a ratio Mw/Mn of from 1.0 through 10, as measured by GPC. When the molecular weight is 20,000 or less, the heat-resistant storage stability and the high-temperature, high-humidity resistant storage stability are unsatisfactory due to residual oligomers. When the molecular weight is 30,000 or more, the low-temperature fixing ability may be impaired.

An acid value of the crystalline polyester resin is not particularly limited and may be appropriately selected depending on the intended purpose, but is preferably 5 mgKOH/g or more, more preferably 10 mgKOH/g or more, for the purpose of achieving a desired low-temperature fixing ability in terms of affinity between paper and resin. Meanwhile, the acid value is preferably 45 mgKOH/g or less for the purpose of improving the hot offset resistance.

A hydroxyl value of the crystalline polyester resin is not particularly limited and may be appropriately selected depending on the intended purpose, but is preferably from 0 mgKOH/g through 50 mgKOH/g, more preferably from 5 mgKOH/g through 50 mgKOH/g, for the purpose of achieving a desired low-temperature fixing ability and an excellent charging property.

A molecular structure of the crystalline polyester resin can be identified by solution-state or solid-state NMR, X-ray diffraction, GC/MS, LC/MS, or IR spectroscopy. In one employable convenient method, one having no absorption based on δCH (out-of-plane bending vibration) of olefin at 965±10 cm$^{-1}$ and 990±10 cm$^{-1}$ in an infrared absorption spectrum is detected as the second polyester resin.

An amount of the crystalline polyester resin is not particularly limited and may be appropriately selected depending on the intended purpose, but is preferably from 3 parts by mass through 20 parts by mass, more preferably from 5 parts by mass through 15 parts by mass, relative to 100 parts by mass of the toner. When the amount is less than 3 parts by mass, the crystalline polyester resin gives an insufficient sharp melt property, potentially leading to poor low-temperature fixing ability of the toner. When the amount is more than 20 parts by mass, the resultant toner may be deteriorated in the heat-resistant storage stability, and image fogging may tend to occur. The amount falling within the more preferable range is advantageous in that the resultant toner is excellent in image quality and low-temperature fixing ability.

<<Release Agent>>

The release agent is not particularly limited and may be selected from those known in the art.

Examples of waxes serving as the release agent include natural waxes such as vegetable waxes (e.g., carnauba wax, cotton wax, Japan wax, and rice wax), animal waxes (e.g., bees wax and lanolin), mineral waxes (e.g., ozokerite and ceresine), and petroleum waxes (e.g., paraffin wax, microcrystalline wax, and petrolatum).

In addition to the natural waxes, synthetic hydrocarbon waxes (e.g., Fischer-Tropsch wax, polyethylene wax, and polypropylene wax) and synthetic waxes (e.g., ester wax, ketone wax, and ether wax) may be used.

Additionally, fatty acid amide compounds such as 12-hydroxystearic acid amide, stearic acid amide, phthalic anhydride imide, and chlorinated hydrocarbons; low-molecular-weight crystalline polymer resins such as polyacrylate homopolymers (e.g., poly-n-stearyl methacrylate and poly-n-lauryl methacrylate) and polyacrylate copolymers (e.g., n-stearyl acrylate-ethyl methacrylate copolymers); and crystalline polymers having a long alkyl group as a side chain may be used.

Among them, hydrocarbon waxes such as paraffin wax, microcrystalline wax, Fischer-Tropsch wax, polyethylene wax, and polypropylene wax are preferable.

A melting point of the release agent is not particularly limited and may be appropriately selected depending on the intended purpose, but is preferably 60° C. or more but 80° C. or less. When the melting point is less than 60° C., the release agent tends to melt at a low temperature, potentially leading to poor heat-resistant storage stability of the toner. In the case where the melting point is more than 80° C., even when the resin melts to be in a fixing temperature range, the release agent insufficiently melts to cause fixing offset, potentially leading to partially lost images.

An amount of the release agent is not particularly limited and may be appropriately selected depending on the intended purpose, but is preferably from 2 parts by mass through 10 parts by mass, more preferably from 3 parts by mass through 8 parts by mass, relative to 100 parts by mass of the toner. When the amount is less than 2 parts by mass, the resultant toner may be deteriorated in the hot offset resistance during fixing and the low-temperature fixing ability. When the amount is more than 10 parts by mass, the resultant toner may be deteriorated in the heat-resistant storage stability, and image fogging may tend to occur. The amount falling within the more preferable range is advantageous in that the image quality and the fixing stability can be improved.

<<Colorant>>

The colorant is not particularly limited and may be appropriately selected depending on the intended purpose. Examples of the colorant include carbon black, nigrosin dyes, iron black, naphthol yellow S, Hansa yellow (10G, 5G, and G), cadmium yellow, yellow iron oxide, yellow ocher, yellow lead, titanium yellow, polyazo yellow, oil yellow, Hansa yellow (GR, A, RN, and R), pigment yellow L, benzidine yellow (G and GR), permanent yellow (NCG), vulcan fast yellow (5G, R), tartrazine lake, quinoline yellow lake, anthrasan yellow BGL, isoindolinone yellow, colcothar, red lead, lead vermilion, cadmium red, cadmium mercury red, antimony vermilion, permanent red 4R, para-red, fiser red, parachloroorthonitro aniline red, lithol fast scarlet G, brilliant fast scarlet, brilliant carmine BS, permanent red (F2R, F4R, FRL, FRLL, and F4RH), fast scarlet VD, vulcan fast rubin B, brilliant scarlet G, lithol rubin GX, permanent red FSR, brilliant carmine 6B, pigment scarlet 3B, Bordeaux 5B, toluidine Maroon, permanent Bordeaux F2K, Helio Bordeaux BL, Bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, Victoria blue lake, metal-free phthalocyanine blue, phthalocyanine blue, fast sky blue, indanthrene blue (RS and BC), indigo, ultramarine, iron blue, anthraquinone blue, fast violet B, methyl violet lake, cobalt purple, manganese violet, dioxane violet, anthraquinone violet, chrome green, zinc green, chromium oxide, viridian, emerald green, pigment green B, naphthol green B, green gold, acid green lake, malachite green lake, phthalocyanine green, anthraquinone green, titanium oxide, zinc flower, and lithopone.

The colorant may be used as a masterbatch which is a composite of the colorant with a resin. Examples of the resin kneaded in production of the masterbatch or together with the masterbatch include, in addition to the first crystalline polyester resin, polymers of styrene or substituted styrene (e.g., polystyrene, poly-p-chlorostyrene, and polyvinyltoluene); styrene copolymers (e.g., styrene-p-chlorostyrene copolymers, styrene-propylene copolymers, styrene-vinyl toluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl α-chloromethacrylate copolymers, styrene-acrylonitrile copolymers, styrene-methyl vinyl ketone copolymers, styrene-butadiene copolymers, styrene-isoprene copolymers, styrene-acrylonitrile-indene copolymers, styrene-maleic acid copolymers, and styrene-maleic acid ester copolymers); polymethyl methacrylate, polybutyl methacrylate, polyvinyl chloride, polyvinyl acetate, polyethylene, polypropylene, polyester, epoxy resins, epoxy polyol resins, polyurethane, polyamide, polyvinyl butyral, polyacrylate resins, rosin, modified rosin, terpene resins, aliphatic or alicyclic hydrocarbon resins, aromatic petroleum resins, chlorinated paraffin, and paraffin wax. These may be used alone or in combination.

The masterbatch can be prepared by mixing and kneading the colorant with the resin for the masterbatch with high shear being applied. In the mixing and kneading, organic solvents may be used for the purpose of enhancing interaction between the colorant and the resin. A so-called flushing method is preferably used. In the flushing method, an aqueous paste containing the colorant is mixed and kneaded with the resin and the organic solvent, the colorant is transferred to the resin, and then water and the organic solvent are removed. Use of the flushing method is preferable because a wet cake of the colorant is used as it is, and it is not necessary to dry the wet cake of the colorant. For the mixing and kneading, a high-shear disperser (e.g., a three-roll mill) is preferably used.

An amount of the colorant is not particularly limited and may be appropriately selected depending on the intended purpose, but is preferably from 1 part by mass through 15 parts by mass, more preferably from 3 parts by mass through 10 parts by mass, relative to 100 parts by mass of the toner.

<<Charge Control Agent>>

The charge control agent is not particularly limited and may be appropriately selected depending on the intended purpose. Examples of the charge control agent include nigrosine dyes, triphenylmethane dyes, chrome-containing metal complex dyes, molybdic acid chelate pigments, rhodamine dyes, alkoxy amines, quaternary ammonium salts (including fluorine-modified quaternary ammonium salts), alkylamides, phosphorus, phosphorus compounds, tungsten, tungsten compounds, fluoroactive agents, metal salts of salicylic acid, and metal salts of salicylic acid derivatives. Specific examples of the charge control agent include BONTRON 03 (a nigrosine dye), BONTRON P-51 (a quaternary ammonium salt), BONTRON S-34 (a metal-containing azo dye), E-82 (an oxynaphthoic acid-based metal complex), E-84 (a salicylic acid-based metal complex), and E-89 (a phenolic condensate) (all of which are available from ORIENT CHEMICAL INDUSTRIES CO., LTD); TP-302 and TP-415 (quaternary ammonium salt molybdenum complexes) (all of which are available from Hodogaya Chemical Co., Ltd.); LRA-901; LR-147 (a boron complex) (available from Japan Carlit Co., Ltd.); copper phthalocyanine; perylene; quinacridone; azo pigments; and polymeric compounds containing a functional group such as a sulfonic acid group, a carboxyl group, and a quaternary ammonium salt.

An amount of the charge control agent is not particularly limited and may be appropriately selected depending on the intended purpose, but is preferably from 0.1 parts by mass through 10 parts by mass, more preferably from 0.2 parts by mass through 5 parts by mass, relative to 100 parts by mass of the toner. When the amount is more than 10 parts by mass, the resultant toner has an excessively high charging ability. As a result, a main effect of the charge control agent is reduced and electrostatic attractive force to a developing roller is increased, potentially leading to lower flowability of the developer or lower image density of the resultant image. These charge control agents may be melt-kneaded with the masterbatch and the resin and then dissolved and dispersed in the organic solvent. Alternatively, needless to say, the charge control agents may be directly added to the organic solvent to be dissolved and dispersed, or may be fixed on surfaces of toner particles after the toner particles are produced.

<<External Additive>>

The external additive may be oxide particles or combination of oxide particles with inorganic particles or hydrophobized inorganic particles. An average primary particle diameter of the hydrophobized inorganic particles is preferably from 1 nm through 100 nm, more preferably from 5 nm through 70 nm.

The external additive preferably includes at least one or more kinds of hydrophobized inorganic particles having an average primary particle diameter of 20 nm or less, and at least one kind of hydrophobized inorganic particles having an average primary particle diameter of 30 nm or more.

The external additive preferably has a specific surface area of from 20 $m^2/g$ through 500 $m^2/g$ as measured by a BET method.

The external additive is not particularly limited and may be appropriately selected depending on the intended purpose. Examples of the external additive include silica particles, hydrophobic silica, fatty acid metal salts (e.g., zinc stearate and aluminium stearate), metal oxides (e.g., titania, alumina, tin oxide, and antimony oxide), and fluoropolymers.

Examples of suitable additives include hydrophobized silica particles, hydrophobized titania particles, hydrophobized titanium oxide particles, and hydrophobized alumina particles. Examples of the silica particles include R972, R974, RX200, RY200, R202, R805, and R812 (all of which are available from Nippon Aerosil Co., Ltd.). Examples of the titania particles include P-25 (available from Nippon Aerosil Co., Ltd.); STT-30 and STT-65C-S (both of which are available from Titan Kogyo, Ltd.); TAF-140 (available from Fuji Titanium Industry Co., Ltd.); and MT-150W, MT-500B, MT-600B, and MT-150A (all of which are available from TAYCA CORPORATION).

Examples of the hydrophobized titanium oxide particles include T-805 (available from Nippon Aerosil Co., Ltd.); STT-30A and STT-65S-S (both of which are available from Titan Kogyo, Ltd.); TAF-500T and TAF-1500T (both of which are available from Fuji Titanium Industry Co., Ltd.); MT-100S and MT-100T (both of which are available from TAYCA CORPORATION); and IT-S (available from ISHIHARA SANGYO KAISHA, LTD.).

The hydrophobized oxide particles, the hydrophobized silica particles, the hydrophobized titania particles, and the hydrophobized alumina particles can be obtained, for example, by treating hydrophilic particles with a silane coupling agent (e.g., methyltrimethoxy silane, methyltriethoxy silane, and octyltrimethoxy silane). Moreover, inorganic particles or silicone-oil-treated oxide particles obtained by treating inorganic particles with silicone oil optionally with heating are also suitable.

Examples of the silicone oil include dimethyl silicone oil, methylphenyl silicone oil, chlorophenyl silicone oil, methyl hydrogen silicone oil, alkyl-modified silicone oil, fluorine-modified silicone oil, polyether-modified silicone oil, alcohol-modified silicone oil, amino-modified silicone oil, epoxy-modified silicone oil, epoxy/polyether-modified silicone oil, phenol-modified silicone oil, carboxyl-modified silicone oil, mercapto-modified silicone oil, methacryl-modified silicone oil, and α-methylstyrene-modified silicone oil.

Examples of the inorganic particles include silica, alumina, titanium oxide, barium titanate, magnesium titanate, calcium titanate, strontium titanate, iron oxide, copper oxide, zinc oxide, tin oxide, quartz sand, clay, mica, wollastonite, diatomaceous earth, chromic oxide, cerium oxide, red iron oxide, antimony trioxide, magnesium oxide, zirconium oxide, parium sulfate, barium carbonate, calcium carbonate, silicon carbide, and silicon nitride. Among them, silica and titanium dioxide are particularly preferable.

An average primary particle diameter of the inorganic particles is not particularly limited and may be appropriately selected depending on the intended purpose, but is preferably 100 nm or less, more preferably 3 nm or more but 70 nm or less. When the average primary particle diameter is smaller than the above-described range, the inorganic particles are embedded in the toner particles, so that it is difficult for the inorganic particles to effectively function. The inorganic particles having an average primary particle diameter greater than the above-described range are not preferable because these inorganic particles unevenly damage the surface of a photoconductor.

An amount of the external additive is not particularly limited and may be appropriately selected depending on the intended purpose, but is preferably from 0.1 parts by mass through 5 parts by mass, more preferably from 0.3 parts by mass through 3 parts by mass, relative to 100 parts by mass of the toner.

<<Flowability Improving Agent>>

The flowability improving agent is not particularly limited and may be appropriately selected depending on the intended purpose, so long as a flowing property and a charging property of the toner can be prevented from deteriorating even under high humidity through surface treatment with the flowability improving agent to increase hydrophobicity. Examples of the flowability improving agent include silane-coupling agents, silylation agents, silane-coupling agents containing a fluoroalkyl group, organic titanate coupling agents, aluminium coupling agents, silicone oil, and modified silicone oil. Silica or titanium oxide is particularly preferably surface-treated with the flowability improving agent to be used as hydrophobic silica or hydrophobic titanium oxide.

<<Cleanability Improving Agent>>

The cleanability improving agent is not particularly limited and may be appropriately selected depending on the intended purpose, so long as the cleanability improving agent is added to the toner for the purpose of removing a developer remaining on a photoconductor or a primary transfer member after transfer. Examples of the cleanability improving agent include fatty acid metal salts such as zinc stearate, calcium stearate, and stearic acid; and polymer particles produced through soap-free emulsion polymerization, such as polymethyl methacrylate particles and polystyrene particles. The polymer particles preferably have a relatively narrow particle size distribution, and the polymer particles suitably have a volume average particle diameter of from 0.01 μm through 1 μm.

<<Magnetic Material>>

The magnetic material is not particularly limited and may be appropriately selected depending on the intended purpose. Examples of the magnetic material include iron powder, magnetite, and ferrite. Among them, the magnetic material is preferably white in terms of a color tone.

A melting point of the toner is not particularly limited and may be appropriately selected depending on the intended purpose, but is preferably 60° C. or more but 80° C. or less.

A volume average particle diameter of the toner is not particularly limited and may be appropriately selected depending on the intended purpose, but is preferably 3 µm or more but 7 µm or less. A ratio of the volume average particle diameter to a number average particle diameter is preferably 1.2 or less. The toner preferably contains a component having a volume average particle diameter of 2 µm or less in an amount of 1% by number or more but 10% by number or less.

<Methods for Calculating and Analyzing Various Properties of Toner and Toner Component>

The first polyester resin, the second polyester resin, the crystalline polyester resin, and the release agent themselves may be measured for the Tg, the acid value, the hydroxyl value, the molecular weight, and the melting point. Alternatively, each of the toner components separated from an actual toner by, for example, gel permeation chromatography (GPC) may be subjected to analysis methods described below to calculate the Tg, the molecular weight, the melting point, and a mass ratio.

For example, the toner components can be separated by GPC as follows.

An eluate obtained in a GPC measurement using tetrahydrofuran (THF) as a mobile phase is fractionated by means of a fraction collector. Among fractions corresponding to a total area of an elution curve, fractions corresponding to a desired molecular weight are combined.

The thus-combined eluates are concentrated and dried with, for example, an evaporator. Then, the resultant solid content is dissolved in a deuterated solvent (e.g., deuterated chloroform and deuterated THF) and subjected to $^1$H-NMR measurement. From an integral ratio of each element, a ratio of constituent monomers of the resin contained in eluted components is calculated.

Alternatively, the eluate is concentrated and then subjected to hydrolysis with, for example, sodium hydroxide. The resultant hydrolyzed product is subjected to qualitative and quantitative analysis by, for example, high performance liquid chromatography (HPLC) to calculate the ratio of constituent monomers. In this case, it is preferable to previously confirm interchangeability with values obtained by the $^1$H-NMR measurement. When the values obtained by the HPLC are different from the values obtained by $^1$H-NMR measurement, it is preferable to confirm a conversion table between the values obtained by the HPLC and the values obtained by $^1$H-NMR measurement.

Note that, in the case where the method for producing a toner forms toner base particles while producing the second polyester resin through at least one of an elongation reaction and a cross-linking reaction between the non-linear reactive precursor and the curing agent, the second polyester resin may be separated from an actual toner by, for example, GPC to be measured for the Tg. Alternatively, the second polyester resin may be separately synthesized through at least one of the elongation reaction and the cross-linking reaction between the non-linear reactive precursor and the curing agent, and the thus-synthesized second polyester resin may be measured for the Tg.

<< Means for Separating Toner Components>>

One exemplary means for separating toner components upon analysis of the toner will now be specifically described.

First, 1 g of a toner is added to 100 mL of THF and stirred at 25° C. for 30 min to obtain a solution in which THF soluble matter is dissolved.

The solution is then filtrated through a 0.2 µm membrane filter to obtain the THF soluble matter in the toner.

Next, the THF soluble matter is dissolved in THF, and the solution is used as a sample for GPC measurement. The sample is injected to GPC used for molecular weight measurement of each resin described above.

Meanwhile, a fraction collector is disposed at an eluate outlet of GPC to fractionate an eluate every predetermined counts. Eluates are obtained every 5% in terms of an area ratio from elution onset on the elution curve (rise of the curve).

Then, for each eluted fraction, 30 mg of a sample is dissolved in 1 mL of deuterated chloroform. As a standard material, 0.05% by volume of tetramethyl silane (TMS) is added.

A glass tube for NMR measurement (diameter; 5 mm) is filled with the resultant solution, and a spectrum is obtained by means of a nuclear magnetic resonance apparatus (JNM-AL 400, available from JEOL Ltd.) by integrating 128 times at a temperature of from 23° C. through 25° C.

Monomer compositions and monomer ratios of the first polyester resin, the second polyester resin, and the crystalline polyester resin contained in the toner can be determined from a peak integral ratio of the obtained spectrum.

For example, peaks are assigned in the following manner, and a constituent monomer component ratio is determined from each integral ratio.

For example, peaks can be assigned such that;

About 8.25 ppm; derived from a benzene ring of trimellitic acid (for one hydrogen atom);

From about 8.07 ppm through about 8.10 ppm: derived from a benzene ring of terephthalic acid (for four hydrogen atoms);

From about 7.1 ppm through about 7.25 ppm: derived from a benzene ring of bisphenol A (for four hydrogen atoms);

About 6.8 ppm: derived from a benzene ring of bisphenol A (for four hydrogen atoms) and derived from a double bond of fumaric acid (for two hydrogen atoms);

From about 5.2 ppm through about 5.4 ppm: derived from methine of a bisphenol A propylene oxide adduct (for one hydrogen atom);

From about 3.7 ppm through about 4.7 ppm: derived from methylene of a bisphenol A propylene oxide adduct (for two hydrogen atoms) and derived from methylene of a bisphenol A ethylene oxide adduct (for four hydrogen atoms); and About 1.6 ppm: derived from a methyl group of bisphenol A (for six hydrogen atoms).

From these results, for example, an extract collected in a fraction in which the first polyester resin accounts for 90% or more can be treated as the first polyester resin.

Similarly, an extract collected in a fraction in which the second polyester resin accounts for 90% or more can be treated as the second polyester resin. An extract collected in a fraction in which the crystalline polyester resin accounts for 90% or more can be treated as the crystalline polyester resin.

<<Methods for Measuring Hydroxyl Value and Acid Value>>

The hydroxyl value can be measured by a method according to JIS K0070-1966.

Specifically, firstly, 0.5 g of a sample is precisely weighed into a 100 mL measuring flask, to which 5 mL of an acetylating reagent is added. Next, the resultant is heated in a warm bath at 100±5° C. for from 1 hour through 2 hours. Then, the flask is taken out from the warm bath and left to stand for cooling. Then, water is added to the flask, and the flask is shaken to decompose acetic anhydride. Then, in order to completely decompose acetic anhydride, the flask is again heated in the warm bath for 10 min or longer and left to stand for cooling. Then, a wall of the flask is washed thoroughly with an organic solvent.

A potential difference automatic titrator, DL-53 TITRATOR (available from Mettler Toledo International Inc.) and an electrode, DG113-SC (available from Mettler Toledo International Inc.) are used to measure the hydroxyl value at 23° C., and analyzing software, LABX LIGHT VERSION 1.00.000 is used for analysis.

For calibration of the titrator, a mixed solvent of toluene (120 mL) and ethanol (30 mL) is used.

In this case, measurement conditions are as follows.
[Measurement Conditions]
Stir
  Speed [%] 25
  Time [s] 15
EQP titration
  Titrant/Sensor
  Titrant CH3ONa
  Concentration [mol/L] 0.1
  Sensor DG115
  Unit of measurement mV
  Predispensing to volume
  Volume [mL] 1.0
  Wait time [s] 0
  Titrant addition Dynamic
  dE (set) [mV] 8.0
  dV (min) [mL] 0.03
  dV (max) [mL] 0.5
  Measure mode Equilibrium controlled
  dE [mV] 0.5
  dt [s] 1.0
  t (min) [s] 2.0
  t (max) [s] 20.0
  Recognition
  Threshold 100.0
  Steepest jump only No
  Range No
  Tendency None
  Termination
  at maximum volume [mL] 10.0
  at potential No
  at slope No
  after number EQPs Yes
    n=1
  comb.termination conditions No
  Evaluation
  Procedure Standard
  Potential1 No
  Potential2 No
  Stop for reevaluation No The acid value can be measured by a method according to JIS K0070-1992.

Specifically, firstly, 0.5 g of a sample (soluble matter in ethyl acetate: 0.3 g) is added to 120 mL of toluene. The resultant was stirred at 23° C. for about 10 hours to dissolve the sample in toluene. Next, 30 mL of ethanol is added to the resultant to prepare a sample solution. Notably, when the sample is not dissolved in toluene, another solvent such as dioxane or tetrahydrofuran is used. Then, a potentiometric automatic titrator, DL-53 TITRATOR (available from Mettler-Toledo K.K.) and an electrode, DG113-SC (available from Mettler-Toledo K.K.) are used to measure the acid value at 23° C. Analysis software, LABX LIGHT VERSION 1.00.000 is used for analysis. Note that, for calibration of the titrator, a mixed solvent of toluene (120 mL) and ethanol (30 mL) is used.

In this case, measurement conditions are the same as the measurement conditions described for the hydroxyl value.

The acid value can be measured in the above-described manner. Specifically, the sample solution is titrated with a pre-standardized 0.1 N potassium hydroxide/alcohol solution and the acid value is calculated from the titer using the following expression: Acid value [mgKOH/g]=Titer (mL)×N×56.1 [mg/mL]/Sample [g] where N denotes a factor of the 0.1 N potassium hydroxide/alcohol solution.

<<Methods for Measuring Melting Point and Glass Transition Temperature (Tg)>>

In the present invention, the melting point and the glass transition temperature (Tg) can be measured, for example, by means of a differential scanning calorimeter (DSC) system ("Q-200", available from TA Instruments Japan Inc.).

Specifically, the melting point and the glass transition temperature of a sample of interest can be measured in the following manner.

Firstly, an aluminium sample container charged with about 5.0 mg of the sample of interest is placed on a holder unit, and the holder unit is then set in an electric furnace. Next, the sample is heated from −80° C. to 150° C. at a heating rate of 10° C./min under a nitrogen atmosphere (first heating). Then, the sample is cooled from 150° C. to −80° C. at a cooling rate of 10° C./min and then heated again to 150° C. at a heating rate of 10° C./min (second heating). DSC curves are generated for the first heating and the second heating by means of a differential scanning calorimeter ("Q-200", available from TA Instruments Japan Inc.).

A DSC curve for the first heating is selected from the resultant DSC curves by means of an analysis program stored in the Q-200 system, and thus the glass transition temperature at the first heating of the sample of interest can be determined. Similarly, a DSC curve for the second heating is selected, and thus the glass transition temperature at the second heating of the sample of interest can be determined.

A DSC curve for the first heating is selected from the resultant DSC curves by means of the analysis program stored in the Q-200 system, and an endothermic peak top temperature at the first heating of the sample of interest can be determined as the melting point. Similarly, the DSC curve for the second heating is selected, and an endothermic peak top temperature at the second heating of the sample of interest can be determined as the melting point.

Herein, when a toner is used as the sample of interest, the glass transition temperature at the first heating is designated as Tg1st, and the glass transition temperature at the second heating is designated as Tg2nd.

Moreover, herein, for the glass transition temperature and the melting point of each of the first polyester resin, the second polyester resin, the crystalline polyester resin, and other components (e.g., the release agent), the endothermic peak top temperature and the Tg at the second heating are determined as the melting point and the Tg of the sample, respectively, unless otherwise stated.

<<Method for Measuring Particle Size Distribution>>

The volume average particle diameter (D4), the number average particle diameter (Dn), and the ratio of the volume average particle diameter to the number average particle diameter (D4/Dn) of the toner can be measured, for example, by means of COULTER COUNTER TA-II or COULTER MULTISIZER II (both of which are available from Beckman Coulter, Inc.). In the present invention, COULTER MULTISIZER II is used. Measurement methods will now be described.

Firstly, a surfactant (preferably polyoxyethylene alkylether (a nonionic surfactant)) serving as a dispersing agent in a volume of from 0.1 mL through 5 mL is added to an aqueous electrolyte solution in a volume of from 100 mL through 150 mL. Here, the aqueous electrolyte solution is a 1% by mass aqueous NaCl solution prepared using 1st grade sodium chloride. For example, ISOTON-II (available from Beckman Coulter, Inc.) can be used. A sample to be measured is added to the resultant solution in an amount of from 2 mg through 20 mg. The resultant aqueous electrolyte solution in which the sample is suspended is dispersed by means of an ultrasonic wave disperser for from about 1 min through about 3 min. The above-described measuring device with an aperture of 100 μm is used to measure the volume and the number of the toner particles or the toner to calculate the volume distribution and the number distribution. From the resultant distributions, the volume average particle diameter (D4) and the number average particle diameter (Dn) of the toner can be determined.

As channels, the following 13 channels are used: 2.00 μm or more but less than 2.52 μm; 2.52 μm or more but less than 3.17 μm; 3.17 μm or more but less than 4.00 μm; 4.00 μm or more but less than 5.04 μm; 5.04 μm or more but less than 6.35 μm; 6.35 μm or more but less than 8.00 μm; 8.00 μm or more but less than 10.08 μm; 10.08 μm or more but less than 12.70 μm; 12.70 μm or more but less than 16.00 μm; 16.00 μm or more but less than 20.20 μm; 20.20 μm or more but less than 25.40 μm; 25.40 μm or more but less than 32.00 μm; and 32.00 μm or more but less than 40.30 μm. Particles having diameters of 2.00 μm or more but less than 40.30 μm are targets for the measurement.

<<Measurement of Molecular Weight>>

A molecular weight of each component of the toner can be measured in the following manner, for example.

Gel permeation chromatography (GPC) measuring device: GPC-8220GPC (available from TOSOH CORPORATION)

Column: TSKgel SuperHZM-H 15 cm, three connected columns (available from TOSOH CORPORATION)

Temperature: 40° C.

Solvent: THF

Flow rate: 0.35 mL/min

Sample: 0.4 mL of a 0.15% by mass sample is injected

Pretreatment of sample: The toner is dissolved in tetrahydrofuran (THF) (containing a stabilizer, available from Wako Chemical Industries, Ltd.) so as to have a concentration of 0.15% by mass and then filtrated through a 0.2 μm filter. The resultant filtrate is used as a sample. A measurement is performed by injecting 100 μL of the sample solution in THF. For the measurement of the molecular weight of the sample, a molecular weight distribution of the sample is calculated from the relationship between the logarithmic value of the calibration curve prepared from several kinds of monodispersed polystyrene standard samples and the number of counts. As the standard polystyrene samples for preparing the calibration curve, SHOWDEX STANDARD Std. Nos. S-7300, S-210, S-390, S-875, S-1980, S-10.9, S-629, S-3.0, and S-0.580 (all of which are available from SHOWA DENKO K.K.) are used. As the detector, a refractive index (RI) detector is used.

<<Method for Extracting THF Insoluble Matter and THF Soluble Matter>>

A THF insoluble matter and a THF soluble matter of the toner can be extracted as follows. Firstly, 1 g of a toner is mixed with 100 g of THF. The resultant mixture is refluxed for 12 hours. Then, the resultant is separated into the THF insoluble matter (solid content) and the THF soluble matter (liquid component).

The THF soluble matter is desolvated, dried under normal pressure at 40° C. for 20 hours, and then dried under reduced pressure at 23° C. for 20 hours. Thus, the THF soluble matter is obtained.

A solid content of the THF insoluble matter is dried under normal pressure at 40° C. for 20 hours and then dried under reduced pressure at 23° C. for 20 hours. Thus, the THF insoluble matter is obtained.

The THF soluble matter of the toner contains the polyester resin for a toner (the first polyester resin) of the present invention. The THF insoluble matter contains the second polyester resin.

<<Method for Measuring Viscoelasticity>>

The storage modulus (G') of the toner can be measured by means of, for example, a dynamic viscoelastometer (ARES, available from TA Instruments Inc.). The measurement is performed at a frequency of 1 Hz.

Specifically, a sample to be measured is formed into a pellet (diameter: 8 mm and thickness: from 1 mm through 2 mm), and the pellet is fixed onto a parallel plate (diameter: 8 mm). Then, the pellet is closely adhered onto the parallel plate at a temperature within from 10° C. through 15° C. of the Tg1st of the toner and is maintained at the same temperature for 15 min. Then, the pellet is cooled to 30° C. while a load applied from the plate to the sample is maintained constant, and is maintained at 30° C. for 48 hours. The storage modulus is measured by heating the thus-prepared sample to 200° C. at a heating rate of 2.0"C/min with a strain amount of 0.1% (in a strain amount control mode) at the start of the measurement.

<<Method for Measuring TMA %>>

Toner particles (5 mg) are formed into tablets by a tablet mold having a diameter of 3 mm (available from Shimadzu Corporation). The resultant tablet is subjected to a thermomechanical analyzer (EXSTAR7000, available from SII NanoTechnology Inc.). The measurement is performed in a compression mode while the tablet is heated from 0° C. to 80° C. at 2° C./min under relative humidity of 70%. The compression force used in this measurement is set to 100 mN. On a graph of a temperature of the sample versus a compression displacement (deformation rate) of the sample, a compression displacement (deformation rate) at 40° C. is read and determined as TMA %.

<Method for Producing Toner>

A method for producing the toner is not particularly limited and may be appropriately selected depending on the intended purpose. For example, the toner is preferably granulated by dispersing, in an aqueous medium, an oil phase containing the first polyester resin, the second polyester resin, and the crystalline polyester resin, and if necessary, further containing, for example, the release agent and the colorant.

The toner is preferably granulated by dispersing, in an aqueous medium, an oil phase containing the non-linear reactive precursor, the first polyester resin, and the crystalline polyester resin, and if necessary, further containing, for example, the curing agent, the release agent, and the colorant.

Examples of the method for producing the toner include a dissolution suspension method known in the art.

As one example of the method for producing the toner, a method in which toner base particles are formed while producing the second polyester resin through at least one of the elongation reaction and the cross-linking reaction between the non-linear reactive precursor and the curing agent will now be described. In such a method, preparation of an aqueous medium, preparation of an oil phase containing toner materials, emulsification or dispersion of the toner materials, and removal of an organic solvent are performed.

<<Preparation of Aqueous Medium (Aqueous Phase)>>

The preparation of the aqueous phase can be performed, for example, by dispersing resin particles in the aqueous medium. An amount of the resin particles to be added to the aqueous medium is not particularly limited and may be appropriately selected depending on the intended purpose, but is preferably from 0.5 parts by mass through 10 parts by mass relative to 100 parts by mass of the aqueous medium.

The aqueous medium is not particularly limited and may be appropriately selected depending on the intended purpose. Examples of the aqueous medium include water, solvents miscible with water, and mixtures of water and solvents miscible with water. These may be used alone or in combination.

Among them, water is preferable.

The solvent miscible with water is not particularly limited and may be appropriately selected depending on the intended purpose. Examples of the solvent miscible with water include alcohols, dimethyl formamide, tetrahydrofuran, cellosolves, and lower ketones. The alcohols are not particularly limited and may be appropriately selected depending on the intended purpose. Examples of the alcohols include methanol, isopropanol, and ethylene glycol. The lower ketones are not particularly limited and may be appropriately selected depending on the intended purpose. Examples of the lower ketones include acetone and methyl ethyl ketone.

<<Preparation of Oil Phase>>

The oil phase containing the toner materials can be prepared by dissolving or dispersing, in an organic solvent, toner materials including at least the non-linear reactive precursor, the first polyester resin, and the crystalline polyester resin, and if necessary, further including, for example, the curing agent, the release agent, and the colorant.

The organic solvent is not particularly limited and may be appropriately selected depending on the intended purpose, but is preferably an organic solvent having a boiling point of lower than 150° C. from the viewpoint of easiness of removal.

The organic solvent having a boiling point of lower than 150° C. is not particularly limited and may be appropriately selected depending on the intended purpose. Examples of the organic solvent having a boiling point of lower than 150° C. include toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone. These may be used alone or in combination.

Among them, ethyl acetate, toluene, xylene, benzene, methylene chloride, 1,2-dichloroethane, chloroform, and carbon tetrachloride are preferable, and ethyl acetate is more preferable.

<<Emulsification or Dispersion>>

The emulsification or dispersion of the toner materials can be performed by dispersing the oil phase containing the toner materials in the aqueous medium. Upon the emulsification or dispersion of the toner materials, the curing agent and the non-linear reactive precursor are allowed to undergo at least one of the elongation reaction and the cross-linking reaction. In this manner, the second polyester resin is produced.

The second polyester resin can be produced through any of the following methods (1) to (3), for example:

(1) a method of producing the second polyester resin by emulsifying or dispersing, in an aqueous medium, an oil phase containing the non-linear reactive precursor and the curing agent, and allowing the curing agent and the non-linear reactive precursor to undergo at least one of the elongation reaction and the cross-linking reaction in the aqueous medium;

(2) a method of producing the second polyester resin by emulsifying or dispersing an oil phase containing the non-linear reactive precursor in an aqueous medium to which the curing agent has been added in advance, and allowing the curing agent and the non-linear reactive precursor to undergo at least one of the elongation reaction and the cross-linking reaction in the aqueous medium; and (3) a method of producing the second polyester resin by emulsifying or dispersing, in an aqueous medium, an oil phase containing the non-linear reactive precursor, adding the curing agent to the aqueous medium, and allowing the curing agent and the non-linear reactive precursor to undergo at least one of the elongation reaction and the cross-linking reaction from interfaces between particles in the aqueous medium.

Note that, when the curing agent and the non-linear reactive precursor are allowed to undergo at least one of the elongation reaction and the cross-linking reaction from the interfaces between particles, the second polyester resin is preferentially formed on surfaces of the produced toner particles. Therefore, it is possible to provide a concentration gradient of the second polyester resin in the toner particles.

Reaction conditions (e.g., reaction time and reaction temperature) for producing the second polyester resin are not particularly limited and may be appropriately selected depending on combinations of the curing agent and the non-linear reactive precursor.

The reaction time is not particularly limited and may be appropriately selected depending on the intended purpose, but is preferably from 10 min through 40 hours, more preferably from 2 hours through 24 hours.

The reaction temperature is not particularly limited and may be appropriately selected depending on the intended purpose, but is preferably from 0° C. through 150° C., more preferably from 40° C. through 98° C.

A method for stably forming a dispersion liquid containing the non-linear reactive precursor in the aqueous medium is not particularly limited and may be appropriately selected depending on the intended purpose. For example, a method in which an oil phase, which has been prepared by dissolving or dispersing toner materials in a solvent, is added to a phase of the aqueous medium and then dispersed with shear force may be used.

A disperser used for the dispersing is not particularly limited and may be appropriately selected depending on the intended purpose. Examples of the disperser include a low-speed shearing disperser, a high-speed shearing disperser, a friction disperser, a high-pressure jetting disperser, and an ultrasonic disperser.

Among them, a high-speed shearing disperser is preferable, because a particle diameter of dispersoid (oil droplets) can be adjusted to be from 2 μm through 20 μm.

When the high-speed shearing disperser is used, conditions (e.g., number of revolutions, dispersing time, and dispersing temperature) may be appropriately selected depending on the intended purpose.

The number of revolutions is not particularly limited and may be appropriately selected depending on the intended purpose, but is preferably from 1,000 rpm through 30,000 rpm, more preferably from 5,000 rpm through 20,000 rpm.

The dispersing time is not particularly limited and may be appropriately selected depending on the intended purpose, but is preferably from 0.1 min through 5 min in a batch manner.

The dispersing temperature is not particularly limited and may be appropriately selected depending on the intended purpose, but is preferably from 0° C. through 150° C., more preferably from 40° C. through 98° C., under pressure. Note that, generally speaking, the dispersing can be easily performed at a high dispersing temperature.

An amount of the aqueous medium used for the emulsification or dispersion of the toner materials is not particularly limited and may be appropriately selected depending on the intended purpose, but is preferably from 50 parts by mass through 2,000 parts by mass, more preferably from 100 parts by mass through 1,000 parts by mass, relative to 100 parts by mass of the toner materials.

When the amount of the aqueous medium is less than 50 parts by mass, the dispersion state of the toner materials is deteriorated, so that toner base particles having a predetermined particle diameter may not be obtained. When the amount of the aqueous medium is more than 2,000 parts by mass, the production cost may increase.

When the oil phase containing the toner materials is emulsified or dispersed, a dispersing agent is preferably used for the purpose of stabilizing dispersoid (e.g., oil droplets) to form toner particles into a desired shape and to give a sharp particle size distribution to the toner particles.

The dispersing agent is not particularly limited and may be appropriately selected depending on the intended purpose. Examples of the dispersing agent include surfactants, water-insoluble inorganic-compound dispersing agents, and polymer protective colloids.

These may be used alone or in combination.

Among them, surfactants are preferable.

The surfactants are not particularly limited and may be appropriately selected depending on the intended purpose. Examples of the surfactants include anionic surfactants, cationic surfactants, nonionic surfactants, and amphoteric surfactants.

The anionic surfactants are not particularly limited and may be appropriately selected depending on the intended purpose. Examples of the anionic surfactants include alkyl benzene sulfonates, α-olefin sulfonates, and phosphoric acid esters.

Among them, those containing a fluoroalkyl group are preferable.

A catalyst can be used in at least one of the elongation reaction and the cross-linking reaction for producing the second polyester resin.

The catalyst is not particularly limited and may be appropriately selected depending on the intended purpose. Examples of the catalyst include dibutyltin laurate and dioctyltin laurate.

<<Removal of Organic Solvent>>

A method for removing the organic solvent from the dispersion liquid (e.g., emulsified slurry) is not particularly limited and may be appropriately selected depending on the intended purpose. Examples of the method include a method in which an entire reaction system is gradually heated to evaporate the organic solvent in the oil droplets and a method in which the dispersion liquid is sprayed in a dry atmosphere to remove the organic solvent in the oil droplets.

Once the organic solvent has been removed, toner base particles are formed. The toner base particles can be subjected to, for example, washing and drying, and can be further subjected to, for example, classification. The classification may be performed by removing fine particles with a cyclone, a decanter, or a centrifuge in a liquid, or may be performed after drying.

The resultant toner base particles may be mixed with particles such as the external additive and the charge control agent. Application of a mechanical impact during the mixing can prevent particles such as the external additive from exfoliating from surfaces of the toner base particles.

A method for applying the mechanical impact is not particularly limited and may be appropriately selected depending on the intended purpose. Examples of the method include a method in which an impact is applied to a mixture by a blade rotating at a high speed and a method in which a mixture is charged into a high-speed gas stream and accelerated to make the particles crash to each other or to an appropriate impact plate.

A device used for the above-described method is not particularly limited and may be appropriately selected depending on the intended purpose. Examples of the device include ANGMILL (available from Hosokawa Micron Corporation), I-type mill (available from Nippon Pneumatic Mfg. Co., Ltd.) modified to reduce a pulverizing air pressure, a hybridization system (available from Nara Machinery Co., Ltd.), a kryptron system (available from Kawasaki Heavy Industries, Ltd.), and an automatic mortar.

(Developer)

A developer of the present invention includes at least the toner; and, if necessary, further includes appropriately selected other components (e.g., a carrier).

Accordingly, the developer is excellent in a transfer property and a charging ability and can stably form high quality images. Note that, the developer may be a one-component developer or a two-component developer, but is preferably the two-component developer from the viewpoint of prolonged service life when used in a high-speed printer responding to the recent improvement in information processing speed.

When the developer is used as the one-component developer, diameters of the toner particles are changed to a small extent even after the toner is supplied and consumed repeatedly. In addition, the toner is less likely to cause filming to a developing roller or fuse to a member such as a blade for thinning a layer thickness of the toner. Moreover, excellent and stable developing ability and images can be achieved even when the developer is stirred in a developing device over a long period of time.

When the developer is used as the two-component developer, diameters of the toner particles are changed to a small extent even after the toner is supplied and consumed repeatedly over a long period of time. In addition, excellent and stable developing ability and images can be achieved even when the developer is stirred in a developing device over a long period of time.

<Carrier>

The carrier is not particularly limited and may be appropriately selected depending on the intended purpose, but is preferably a carrier containing a core and a resin layer covering the core.

<<Core>>

A material of the core is not particularly limited and may be appropriately selected depending on the intended purpose. Examples of the material include manganese-strontium materials (from 50 emu/g through 90 emu/g) and manganese-magnesium materials (from 50 emu/g through 90 emu/g). In order to ensure a sufficient image density, high magnetic materials such as iron powder (100 emu/g or higher) and magnetite (from 75 emu/g through 120 emu/g) are preferably used. Meanwhile, low magnetic materials such as copper-zinc materials (from 30 emu/g through 80 emu/g) are preferably used because it is possible to reduce an impact applied to a photoconductor by the developer in the form of a brush, which is advantageous for improving image quality.

These may be used alone or in combination.

A volume average particle diameter of the core is not particularly limited and may be appropriately selected depending on the intended purpose, but is preferably from 10 μm through 150 μm, more preferably from 40 μm through 100 μm. When the volume average particle diameter is less than 10 μm, the amount of fine carrier particles is increased to decrease magnetization per particle, potentially leading to carrier scattering. When the volume average particle diameter is more than 150 μm, the carrier particles are decreased in specific surface area, potentially leading to toner scattering. Especially, in the case of full-color printing of images containing many solid image portions, reproducibility in the solid image portions is deteriorated.

When the toner is used for the two-component developer, the toner may be mixed with the carrier. An amount of the carrier contained in the two-component developer is not particularly limited and may be appropriately selected depending on the intended purpose, but is preferably from 90 parts by mass through 98 parts by mass, more preferably from 93 parts by mass through 97 parts by mass, relative to 100 parts by mass of the two-component developer.

The developer of the present invention may be suitably used in image formation by various known electrophotographies such as magnetic one-component developing methods, non-magnetic one-component developing methods, and two-component developing methods.

(Developer Stored Container)

A developer stored container of the present invention contains the developer of the present invention. A container of the developer stored container is not particularly limited and may be appropriately selected from containers known in the art. Examples of the container include containers including a container main body and a cap.

A size, a shape, a structure, and a material of the container main body are not particularly limited. The container main body is preferably, for example, cylindrical. Particularly preferably, the container has spirally-arranged concavo-convex portions on an inner circumferential surface, the developer contained in the container can be transferred to an outlet port by rotating the container, and some or all of the spirally-arranged concavo-convex portions are folded like bellows. The materials of the container are not particularly limited but preferably have excellent dimensional accuracy. Examples of the materials include polyester resins, polyethylene resins, polypropylene resins, polystyrene resins, polyvinyl chloride resins, polyacrylic acids, polycarbonate resins, ABS resins, and polyacetal resins.

The developer stored container can be easily stored or transported and has excellent handleability. Therefore, the developer stored container can be detachably mounted to, for example, process cartridges or image forming apparatuses described below to replenish the developer.

(Image Forming Apparatus and Image Forming Method)

An image forming apparatus of the present invention includes at least an electrostatic latent image bearer, an electrostatic-latent-image-forming means, and a developing means; and, if necessary, further includes other means.

An image forming method of the present invention includes at least an electrostatic-latent-image-forming step and a developing step; and, if necessary, further includes other steps.

The image forming method can suitably be performed by the image forming apparatus. The electrostatic-latent-image-forming step can suitably be performed by the electrostatic-latent-image-forming means. The developing step can suitably be performed by the developing means. The other steps can suitably be performed by the other means.

<Electrostatic Latent Image Bearer>

A material, a structure, and a size of the electrostatic latent image bearer are not particularly limited and may be appropriately selected from those known in the art. Examples of the material of the electrostatic latent image bearer include inorganic photoconductors (e.g., amorphous silicon and selenium) and organic photoconductors (e.g., polysilane and phthalopolymethine). Among them, amorphous silicon is preferable from the viewpoint of long service life.

The amorphous silicon photoconductor may be a photoconductor which is produced by heating a support to be a temperature of from 50° C. through 400° C. and then forming a photoconductive layer of a-Si on the support through film formation methods (e.g., vacuum vapor deposition, sputtering, ion plating, thermal CVD (Chemical Vapor Deposition), photo-CVD, and plasma CVD). Among them, suitable is the plasma CVD; i.e., a method in which gaseous raw materials are decomposed through application of direct current or high frequency or through microwave glow discharge, to form an a-Si deposited film on the support.

The shape of the electrostatic latent image bearer is not particularly limited and may be appropriately selected depending on the intended purpose, but is preferably cylindrical. An outer diameter of the cylindrical electrostatic latent image bearer is not particularly limited and may be appropriately selected depending on the intended purpose, but is preferably from 3 mm through 100 mm, more preferably from 5 mm through 50 mm, particularly preferably from 10 mm through 30 mm.

<Electrostatic-Latent-Image-Forming Means and Electrostatic-Latent-Image-Forming Step>

The electrostatic-latent-image-forming means is not particularly limited and may be appropriately selected depending on the intended purpose, so long as the electrostatic-latent-image-forming means is configured to form an electrostatic latent image on the electrostatic latent image bearer. Examples of the electrostatic-latent-image-forming means include a means including at least: a charging member configured to charge a surface of the electrostatic latent image bearer; and an exposure member configured to imagewise expose the surface of the electrostatic latent image bearer to light.

The electrostatic-latent-image-forming step is not particularly limited and may be appropriately selected depending on the intended purpose, so long as the electrostatic-latent-image-forming step is a step of forming an electrostatic latent image on the electrostatic latent image bearer. The electrostatic-latent-image-forming step can be performed using the electrostatic-latent-image-forming means by, for example, charging a surface of the electrostatic latent image bearer and then imagewise exposing the surface to light.

<<Charging Member and Charging>>

The charging member is not particularly limited and may be appropriately selected depending on the intended purpose. Examples of the charging member include contact chargers known per se including a conductive or semiconductive roller, brush, film and rubber blade; and non-contact chargers utilizing corona discharge such as corotron and scorotron.

The charging can be performed by, for example, applying voltage to a surface of the electrostatic latent image bearer using the charging member.

The charging member may have any shape such as a magnetic brush or a fur brush as well as a roller. The shape of the charging member may be selected according to the specification or configuration of the image forming apparatus.

The charging member is not limited to the contact charging members as described above. However, the contact charging members are preferably used because it is possible to produce an image forming apparatus in which a lower amount of ozone is generated from the charging member.

<<Exposure Member and Exposure>>

The exposure member is not particularly limited and may be appropriately selected depending on the intended purpose, so long as the exposure member can imagewise expose a surface of the electrostatic latent image bearer, which has been charged with the charging member, to light according to an image to be formed. Examples of the exposure member include various exposure members such as copy optical exposure members, rod lens array exposure members, laser optical exposure members, and liquid crystal shutter optical exposure members.

A light source used for the exposure member is not particularly limited and may be appropriately selected depending on the intended purpose. Examples of the light source include light emitters in general such as fluorescent lamps, tungsten lamps, halogen lamps, mercury lamps, sodium lamps, light-emitting diodes (LED), laser diodes (LD), and electroluminescence (EL) devices.

Also, various filters may be used for the purpose of emitting only light having a desired wavelength range. Examples of the filters include sharp-cut filters, band-pass filters, infrared cut filters, dichroic filters, interference filters, and color temperature conversion filters.

The exposure can be performed by, for example, imagewise exposing a surface of the electrostatic latent image bearer to light using the exposure member.

Note that, in the present invention, a back-exposure method may be employed. That is, the electrostatic latent image bearer may be imagewise exposed to light from a back side.

<Developing Means and Developing Step>

The developing means is not particularly limited and may be appropriately selected depending on the intended purpose, so long as the developing means includes a toner and is configured to develop the electrostatic latent image formed on the electrostatic latent image bearer to form a visible image.

The developing step is not particularly limited and may be appropriately selected depending on the intended purpose, so long as the developing step is a step of developing the electrostatic latent image formed on the electrostatic latent image bearer with a toner to form a visible image. The developing step can be performed by the developing means.

The developing means may be used in a dry-developing manner or a wet-developing manner, and may be a monochrome developing means or a multi-color developing means.

The developing means preferably includes a stirrer configured to charge the toner by friction generated during stirring; a magnetic-field generating means which is fixed inside the developing means; and a developer bearer configured to be rotatable while bearing a developer containing the toner on a surface of the developer bearer.

In the developing means, for example, the toner and the carrier are stirred and mixed, so that the toner is charged by friction generated during stirring and mixing. The thus-charged toner is held in the form of a brush on a surface of a rotating magnetic roller to form a magnetic brush. The magnetic roller is disposed adjacent to the electrostatic latent image bearer and thus part of the toner constituting the magnetic brush formed on the surface of the magnet roller is transferred onto a surface of the electrostatic latent image bearer by the action of electrically attractive force. As a result, the electrostatic latent image is developed with the toner to form a visual toner image on the surface of the electrostatic latent image bearer.

<Other Means and Other Steps>

Examples of the other means include a transfer means, a fixing means, a cleaning means, a charge-eliminating means, a recycling means, and a control means.

Examples of the other steps include a transfer step, a fixing step, a cleaning step, a charge-eliminating step, a recycling step, and a control step.

<<Transfer Means and Transfer Step>>

The transfer means is not particularly limited and may be appropriately selected depending on the intended purpose, so long as the transfer means is configured to transfer the visible image onto a recording medium. Preferably, the transfer means includes a primary transfer means configured to transfer the visible image onto an intermediate transfer member to form a composite transfer image; and a secondary transfer means configured to transfer the composite transfer image onto a recording medium.

The transfer step is not particularly limited and may be appropriately selected depending on the intended purpose, so long as the transfer step is a step of transferring the visible image onto a recording medium. Preferably, the transfer step includes primarily transferring the visible image onto the intermediate transfer member and then secondarily transferring the visible image onto the recording medium.

For example, the transfer step can be performed using the transfer means by charging the photoconductor with a transfer charger to transfer the visible image.

Here, when the image to be secondarily transferred onto the recording medium is a color image made of a plurality of color toners, the transfer step may be performed as follows: the color toners are sequentially superposed on top of another on the intermediate transfer member by the transfer means to form an image on the intermediate transfer member, and then, the image on the intermediate transfer member is secondarily transferred at one time onto the recording medium by the intermediate transfer means.

The intermediate transfer member is not particularly limited and may be appropriately selected from known transfer members depending on the intended purpose. For example, the intermediate transfer member is suitably a transfer belt.

The transfer means (the primary transfer means and the secondary transfer means) preferably includes at least a transfer device configured to transfer the visible image formed on the photoconductor onto the recording medium utilizing peeling charging. Examples of the transfer device include corona transfer devices utilizing corona discharge, transfer belts, transfer rollers, pressing transfer rollers, and adhesive transfer devices.

The recording medium is not particularly limited and may be appropriately selected depending on the purpose, so long as a developed but unfixed image can be transferred onto the recording medium. Typically, plain paper is used as the recording medium, but a PET base for OHP can also be used.

<<Fixing Means and Fixing Step>>

The fixing means is not particularly limited and may be appropriately selected depending on the intended purpose, so long as the fixing means is configured to fix a transferred image which has been transferred on the recording medium. The fixing means is preferably a known heating-pressurizing member. Examples of the heating-pressurizing member include a combination of a heat roller and a press roller and a combination of a heat roller, a press roller, and an endless belt.

The fixing step is not particularly limited and may be appropriately selected depending on the intended purpose, so long as the fixing step is a step of fixing a visible image which has been transferred on the recording medium. The fixing step may be performed every time an image of each color toner is transferred onto the recording medium, or at one time (i.e., at the same time) on a superposed image of color toners.

The fixing step can be performed by the fixing means.

The heating-pressurizing member usually performs heating preferably at from 80° C. through 200° C.

Note that, in the present invention, known photofixing devices may be used instead of or in addition to the fixing means depending on the intended purpose.

A surface pressure at the fixing step is not particularly limited and may be appropriately selected depending on the intended purpose, but is preferably from 10 N/cm$^2$ through 80 N/cm$^2$.

<<Cleaning Means and Cleaning Step>>

The cleaning means is not particularly limited and may be appropriately selected depending on the intended purpose, so long as the cleaning means is configured to be able to remove the toner remaining on the photoconductor. Examples of the cleaning means include magnetic brush cleaners, electrostatic brush cleaners, magnetic roller cleaners, blade cleaners, brush cleaners, and web cleaners.

The cleaning step is not particularly limited and may be appropriately selected depending on the intended purpose, so long as the cleaning step is a step of being able to remove the toner remaining on the photoconductor. The cleaning step may be performed by the cleaning means.

<<Charge-Eliminating Means and Charge-Eliminating Step>>

The charge-eliminating means is not particularly limited and may be appropriately selected depending on the intended purpose, so long as the charge-eliminating means is configured to apply a charge-eliminating bias to the photoconductor to charge-eliminate the photoconductor. Examples of the charge-eliminating means include charge-eliminating lamps.

The charge-eliminating step is not particularly limited and may be appropriately selected depending on the intended purpose, so long as the charge-eliminating step is a step of applying a charge-eliminating bias to the photoconductor for charge elimination. The charge-eliminating step may be performed by the charge-eliminating means.

<<Recycling Means and Recycling Step>>

The recycling means is not particularly limited and may be appropriately selected depending on the intended purpose, so long as the recycling means is configured to recycle the toner, which has been removed in the cleaning step, to the developing device. Examples of the recycling means include known conveying means.

The recycling step is not particularly limited and may be appropriately selected depending on the intended purpose, so long as the recycling step is a step of recycling the toner, which has been removed in the cleaning step, to the developing device. The recycling step can be performed by the recycling means.

<<Control Means and Control Step>>

The control means is not particularly limited and may be appropriately selected depending on the intended purpose, so long as the control means is configured to be able to control operation of each of the above means. Examples of the control means include devices such as sequencers and computers.

The control step is not particularly limited and may be appropriately selected depending on the intended purpose, so long as the control step is a step of being able to control operation of each of the above steps. The control step can be performed by the control means.

One aspect of a method for forming an image by an image forming apparatus of the present invention will now be described referring to FIG. 1. A color image forming apparatus 100A illustrated in FIG. 1 includes a photoconductor drum 10 serving as the electrostatic latent image bearer (hereinafter may be referred to as a "photoconductor 10"), a charging roller 20 serving as the charging means, an exposure device 30 serving as the exposure means, a developing device 40 serving as the developing means, an intermediate transfer member 50, a cleaning device 60 including a cleaning blade and serving as the cleaning means, and a charge-eliminating lamp 70 serving as the charge-eliminating means.

The intermediate transfer member 50 is an endless belt and is designed so as to be movable in a direction indicated by the arrow by three rollers 51. The three rollers 51 are disposed inside the belt and the belt is stretched around the three rollers 51. Some of the three rollers 51 also function as a transfer bias roller which may apply a predetermined transfer bias (primary transfer bias) to the intermediate transfer member 50. A cleaning device 90 including a cleaning blade is disposed adjacent to the intermediate transfer member 50. Further, a transfer roller 80 serving as the transfer means is disposed adjacent to the intermediate transfer member 50 so as to face the intermediate transfer member 50. The transfer roller 80 can apply a transfer bias for transferring (secondarily transferring) a developed image (toner image) onto a sheet of transfer paper 95 serving as a recording medium. Around the intermediate transfer member 50, a corona charger 58, which is configured to apply charges to a toner image on the intermediate transfer member 50, is disposed between a contact portion of the photoconductor 10 with the intermediate transfer member 50 and a contact portion of the intermediate transfer member 50 with the sheet of the transfer paper 95 in a rotational direction of the intermediate transfer member 50.

The developing device 40 includes a developing belt 41 serving as the developer bearer and developing units arranged around the developing belt 41 (a black developing unit 45K, a yellow developing unit 45Y, a magenta developing unit 45M, and a cyan developing unit 45C). Note that, the black developing unit 45K includes a developer stored container 42K, a developer supply roller 43K, and a developing roller 44K. The yellow developing unit 45Y includes a developer stored container 42Y, a developer supply roller 43Y, and a developing roller 44Y. The magenta developing unit 45M includes a developer stored container 42M, a developer supply roller 43M, and a developing roller 44M. The cyan developing unit 45C includes a developer stored container 42C, a developer supply roller 43C, and a developing roller 44C. Also, the developing belt 41 is an endless belt which is rotatably stretched around a plurality of belt rollers and is partially in contact with the electrostatic latent image bearer 10.

In the color image forming apparatus 100 illustrated in FIG. 1, for example, the charging roller 20 uniformly charges the photoconductor drum 10. The exposure device 30 imagewise exposes the photoconductor drum 10 to light to form an electrostatic latent image. The electrostatic latent image formed on the photoconductor drum 10 is developed with a toner supplied from the developing device 40 to form a toner image. The toner image is transferred (primarily transferred) onto the intermediate transfer member 50 by voltage applied from the roller 51 and then transferred (secondarily transferred) onto the sheet of the transfer paper 95. As a result, a transferred image is formed on the sheet of the transfer paper 95. Note that, a residual toner remaining on the photoconductor 10 is removed by the cleaning device 60, and the photoconductor 10 is once charge-eliminated by the charge-eliminating lamp 70.

Figure 2:
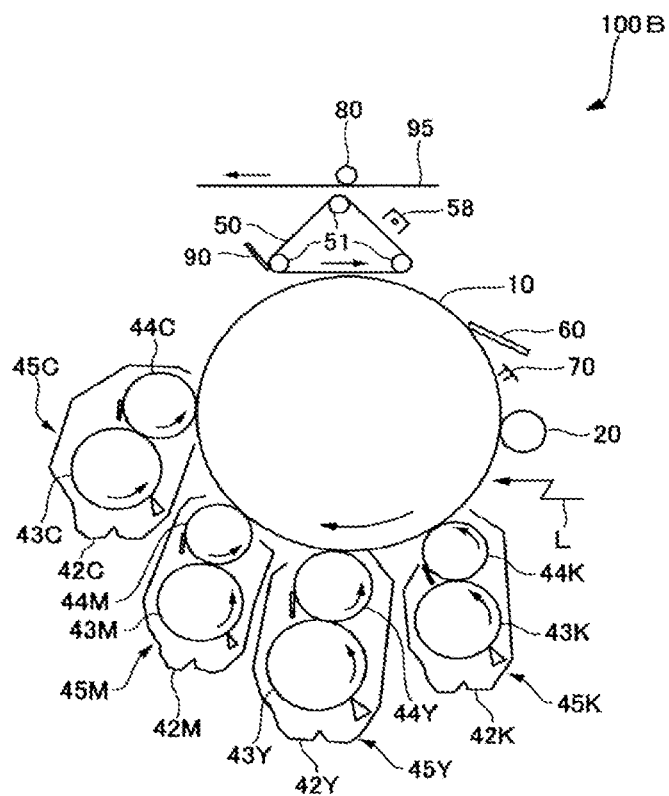
FIG. 2 is a schematic, configurational view illustrating another exemplary image forming apparatus according to the present invention.

FIG. 2 illustrates another exemplary image forming apparatus of the present invention. An image forming apparatus 100B has the same configuration as the image forming apparatus 100A illustrated in FIG. 1 except that the developing belt 41 is not included and the black developing unit 45K, the yellow developing unit 45Y, the magenta developing unit 45M, and the cyan developing unit 45C are disposed around the photoconductor drum 10 so as to directly face the photoconductor drum 10.

Figure 3:
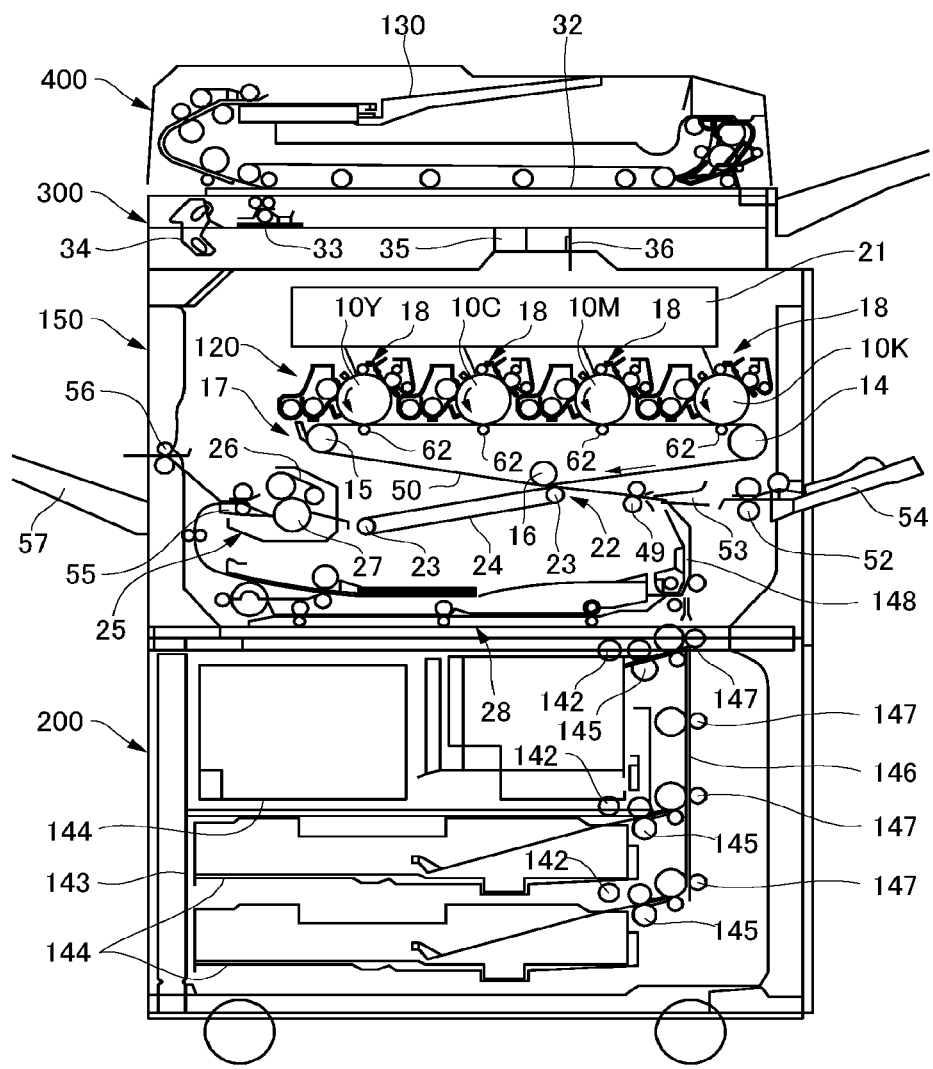
FIG. 3 is a schematic, configurational view illustrating another exemplary image forming apparatus according to the present invention.

FIG. 3 illustrates another exemplary image forming apparatus of the present invention. The image forming apparatus illustrated in FIG. 2 includes a copier main body 150, a paper feeding table 200, a scanner 300, and an automatic document feeder (ADF) 400.

An endless-belt-type intermediate transfer member 50 is disposed at a central part of the copier main body 150. The intermediate transfer member 50 is stretched around support rollers 14, 15 and 16 and is configured to be rotatable in the clockwise direction in FIG. 3. A cleaning device for an intermediate transfer member 17 is disposed adjacent to the support roller 15, and is configured to remove a residual toner remaining on the intermediate transfer member 50. A tandem developing device 120, in which four image forming means 18 of yellow, cyan, magenta, and black are arranged in parallel along a conveying direction of the intermediate transfer member 50 so as to face the intermediate transfer member 50, is disposed on the intermediate transfer member 50 which is stretched around the support rollers 14 and 15. An exposure device 21 serving as the exposure member is disposed adjacent to the tandem developing device 120. A secondary transfer device 22 is disposed on a side of the intermediate transfer member 50 opposite to the side on which the tandem developing device 120 is disposed. The secondary transfer device 22 includes a secondary transfer belt 24 which is an endless belt, and the secondary transfer belt 24 is stretched around a pair of rollers 23. In this configuration, a sheet of transfer paper conveyed on the secondary transfer belt 24 and the intermediate transfer member 50 can contact with each other. A fixing device 25 serving as the fixing means is disposed adjacent to the secondary transfer device 22. The fixing device 25 includes a fixing belt 26 which is an endless belt and a press roller 27 which is disposed so as to be pressed against the fixing belt.

Note that, in the tandem image forming apparatus, a sheet inverting device 28 is disposed adjacent to the secondary transfer device 22 and the fixing device 25. The sheet inverting device 28 is configured to invert the sheet of the transfer paper in the case of forming images on both sides of the sheet of the transfer paper.

Next, a method for forming a full-color image (color-copying) using the tandem developing device 120 will now be described. Firstly, a document is set on a document table 130 of the automatic document feeder (ADF) 400. Alternatively, the automatic document feeder 400 is opened, the document is set on a contact glass 32 of the scanner 300 and the automatic document feeder 400 is closed.

When a start button (not illustrated) is pressed, the document is conveyed onto the contact glass 32 and then the scanner 300 operates in the case where the document has been set on the automatic document feeder 400; or the scanner 300 operates immediately in the case where the document has been set on the contact glass 32. Then, a first travelling body 33 and a second travelling body 34 travel. At this time, the document is irradiated with light from a light source in the first travelling body 33. The light reflected from a surface of the document is reflected by a mirror in the second travelling body 34 and then is received by a reading sensor 36 through an imaging forming lens 35. Thus, the color document (color image) is read to obtain image information of black, yellow, magenta, and cyan.

Figure 4:
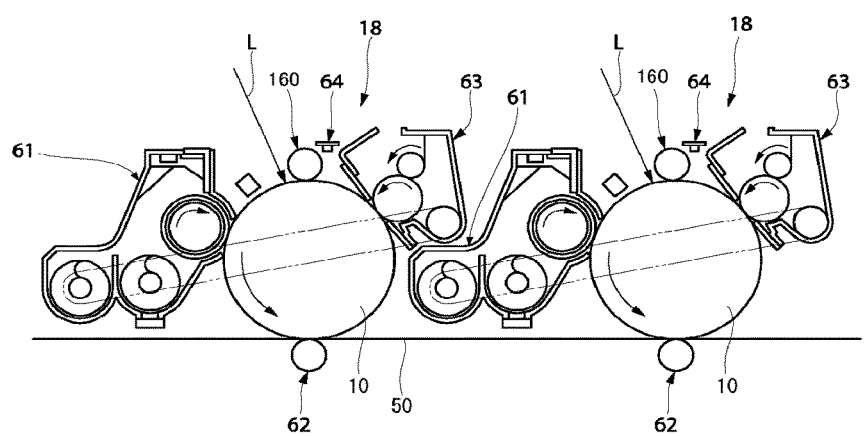
FIG. 4 is a partially enlarged view of FIG. 3.

The image information of black, yellow, magenta, and cyan is transmitted to the image forming means 18 (black-image-forming means, yellow-image-forming means, magenta-image-forming means, and cyan-image-forming means) in the tandem developing device 120 to form toner images of black, yellow, magenta, and cyan in the image forming means. As illustrated in FIG. 4, the image forming means 18 (black-image-forming means, yellow-image-forming means, magenta-image-forming means, and cyan-image-forming means) in the tandem developing device 120 include electrostatic latent image bearers 10 (black-electrostatic-latent image bearer 10K, yellow-electrostatic-latent image bearer 10Y, magenta-electrostatic-latent image bearer 10M, and cyan-electrostatic-latent image bearer 10C); a charging device 160 serving as the charging means and configured to uniformly charge the electrostatic latent image bearers 10; an exposure device configured to imagewise expose the electrostatic latent image bearers to light (L in FIG. 4) based on image information of colors to form electrostatic latent images corresponding to color images on the electrostatic latent image bearers; a developing device 61 serving as the developing means and configured to develop the electrostatic latent images with color toners (black toner, yellow toner, magenta toner, and cyan toner) to form toner images of the color toners; a transfer charger 62 configured to transfer the toner images onto the intermediate transfer member 50; a cleaning device 63; and a charge-eliminating device 64. The image forming means 18 can form monochrome images (black image, yellow image, magenta image, and cyan image) based on the image information of colors. The thus-formed black image (i.e., a black image formed on the black-electrostatic-latent image bearer 10K), the thus-formed yellow image (i.e., a yellow image formed on the yellow-electrostatic-latent image bearer 10Y), the thus-formed magenta image (i.e., a magenta image formed on the magenta-electrostatic-latent image bearer 10M), and the thus-formed cyan image (i.e., a cyan image formed on the cyan-electrostatic-latent image bearer 10C) are sequentially transferred (primarily transferred) onto the intermediate transfer member 50 which is rotatably moved by the support rollers 14, 15 and 16. The black image, the yellow image, the magenta image, and the cyan image are superposed on the intermediate transfer member 50 to form a composite color image (color transferred image).

Meanwhile, in the paper feeding table 200, one of paper feeding rollers 142 is selectively rotated to feed a sheet (recording paper) from one of paper feeding cassettes 144 which are placed in multiple stages in a paper bank 143. The sheet is separated one by one by a separation roller 145 and sent to a paper feeding path 146. Then, the sheet is conveyed by a conveying roller 147, is guided to a paper feeding path 148 in the copier main body 150, and is stopped by a registration roller 49. Alternatively, a paper feeding roller 142 is rotated to feed a sheet (recording paper) on a manual paper feeding tray 54. The sheet is separated one by one by a separation roller 52, is guided to a manual paper feeding path 53, and is stopped by the registration roller 49. Note that, the registration roller 49 is generally grounded in use, but the registration roller 49 may also be used in a state where a bias is being applied to the registration roller 49 for the purpose of removing paper dust from the sheet. Then, the registration roller 49 is rotated in synchronization with the composite color image (color transferred image) formed on the intermediate transfer member 50 and the sheet (recording paper) is fed to between the intermediate transfer member 50 and the secondary transfer device 22. Thus, the composite color image (color transferred image) is transferred (secondarily transferred) onto the sheet (recording paper) by the secondary transfer device 22 to form a color image on the sheet (recording paper). Note that, a residual toner remaining on the intermediate transfer member 50 after image transfer is removed by the cleaning device for an intermediate transfer member 17.

The sheet (recording paper), on which the color image has been transferred and formed, is conveyed by the secondary transfer device 22 to the fixing device 25. The fixing device 25 fixes the composite color image (color transferred image) on the sheet (recording paper) by the action of heat and pressure. Next, the sheet (recording paper) is switched by a switching claw 55, is ejected by an ejection roller 56, and is stacked in a paper ejection tray 57. Alternatively, the sheet is switched by the switching claw 55, is inverted by the sheet inverting device 28, and then is guided to a transfer position again. An image is also recorded on a back side of the sheet, and then the sheet is ejected by the ejection roller 56 and stacked in the paper ejection tray 57.

(Process Cartridge)

A process cartridge of the present invention is molded so as to be detachably mounted to various image forming apparatuses. The process cartridge includes at least an electrostatic latent image bearer configured to bear an electrostatic latent image; and a developing means configured to develop the electrostatic latent image borne on the electrostatic latent image bearer with the developer of the present invention to form a toner image. Note that, the process cartridge of the present invention may further include other means, if necessary.

The developing means includes at least: a developer stored container configured to contain the developer of the present invention; and a developer bearer configured to bear and convey the developer contained in the developer stored container. Note that, the developing means may further include, for example, a regulating member configured to regulate a thickness of the developer to be borne.

Figure 5:
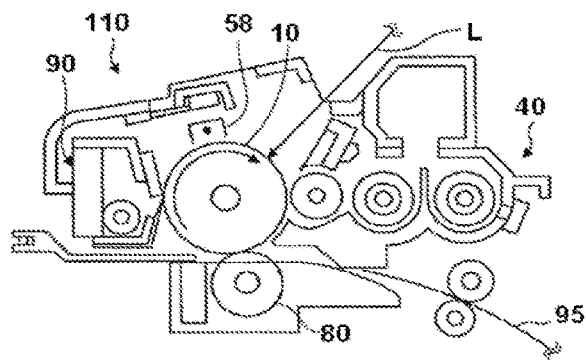
FIG. 5 is a schematic, configurational view illustrating one exemplary process cartridge.

FIG. 5 illustrates one exemplary process cartridge of the present invention. A process cartridge 110 includes a photoconductor drum 10, a corona charger 52, a developing device 40, a transfer roller 80, and a cleaning device 90.

EXAMPLES

The present invention will now be described by way of the following Examples. However, the present invention is not limited to the Examples in any way. Unless otherwise specified, "part(s)" means "part(s) by mass" and "%" means "% by mass."

Measurements in the Examples were measured according to methods described herein. Note that, Tg, Tm, and molecular weights of, for example, the first polyester resin, the second polyester resin, and the crystalline polyester resin were measured on resins obtained in Production Examples.

Example A

<Production of First Polyester Resin A>
<<Synthesis of First Polyester Resin A-1>>

A four-necked flask equipped with a nitrogen-introducing tube, a drain tube, a stirrer, and a thermocouple was charged with bisphenol A ethylene oxide 2 mol adduct (BisA-EO), bisphenol A propylene oxide 3 mol adduct (BisA-PO), trimethylolpropane (TMP), terephthalic acid, and adipic acid (ADA) so that a molar ratio among the bisphenol A ethylene oxide 2 mol adduct, the bisphenol A propylene oxide 3 mol adduct, and the trimethylolpropane (bisphenol A ethylene oxide 2 mol adduct/bisphenol A propylene oxide 3 mol adduct/trimethylolpropane) was 38.6/57.9/3.5, a molar ratio of terephthalic acid to adipic acid (terephthalic acid/adipic acid) was 85/15, and a molar ratio of hydroxyl groups to carboxyl groups (OH/COOH) was 1.12. The resultant mixture was allowed to react with titanium tetraisopropoxide (500 ppm relative to the resin components) at 230° C. under normal pressure for 8 hours, and was further reacted under reduced pressure of from 10 mmHg through 15 mmHg for 4 hours. Then, trimellitic anhydride was added to the reaction vessel in an amount of 1 mol % relative to all the resin components, and was allowed to react at 180° C. under normal pressure for 3 hours to obtain [First polyester resin A-1]. Physical properties of the [First polyester resin A-1] are presented in Table 1-1.

<<Synthesis of First Polyester Resins A-2 to A-18>>

[First polyester resin A-2] to [First polyester resin A-18] were obtained in the same manner as in the synthesis of the [First polyester resin A-1], except that the acid components, the alcohol components, the OH/COO ratio, the kind of branched component, and the amount of branched component were changed to acid components, alcohol components, OH/COO ratios, kinds of branched component, and amounts of branched component presented in Tables 1-1 to 1-4. Physical properties of the [First polyester resin A-2] to the [First polyester resin A-18] are presented in Tables 1-1 to 1-4.

Note that, in Tables 1-1 to 1-4, the amount of branched component denotes a percent by mole of the trivalent or higher aliphatic alcohol relative to the alcohol component. However, the amount of branched component in Comparative Example 1 denotes a percent by mole of trimellitic acid relative to the carboxylic acid component.

In Tables 1-1 to 1-4, the interbranch distance refers to a value calculated according to the following expression:

$$\text{Interbranch distance} = \frac{Mw}{\begin{pmatrix} \text{Valence of the trivalent or} \\ \text{higher aliphatic alcohol} \end{pmatrix} \times \begin{pmatrix} \text{Amount of the trivalent or} \\ \text{higher aliphatic alcohol} \end{pmatrix}}.$$

In the above expression, the "Amount of the trivalent or higher aliphatic alcohol" denotes a percent by mole relative to the alcohol component.

However, in Comparative Example 1, the "trivalent or higher aliphatic alcohol" in the expression above is replaced with trimellitic acid.

(Synthesis of Ketimine)

A reaction vessel to which a stirring bar and a thermometer had been set was charged with 170 parts of isophoronediamine and 75 parts of methyl ethyl ketone. The resultant mixture was allowed to react at 50° C. for 5 hours to obtain [Ketimine compound 1].

The [Ketimine compound 1] was found to have an amine value of 418.

(Production of Prepolymer B)

<Synthesis of Non-Linear Polyester Resin Having Reactive Group B-1 (Prepolymer B-1)>

A reaction vessel equipped with a condenser, a stirrer, and a nitrogen-introducing tube was charged with alcohol components (97 mol % of 3-methyl-1,5-pentanediol and 3 mol % of trimethylolpropane (TMP)) and acid components (50 mol % of adipic acid and 50 mol % of terephthalic acid) so that the molar ratio of hydroxyl groups to carboxyl groups (OH/COOH) was 1.1, together with titanium tetraisopropoxide (300 ppm relative to the resin components). Then, the resultant mixture was heated to 200° C. for about 4 hours and then to 230° C. for 2 hours, and allowed to react until water was not run off. Then, the resultant was further allowed to react under reduced pressure of from 10 mmHg through 15 mmHg for 5 hours to obtain [Intermediate polyester B-1].

Next, a reaction vessel equipped with a condenser, a stirrer, and a nitrogen-introducing tube was charged with the [Intermediate polyester B-1] and isophorone diisocyanate (IPDI) so that a molar ratio of isocyanate groups in IPDI/ hydroxyl groups in the Intermediate polyester was 2.1. The resultant was diluted with ethyl acetate to give a 48% ethyl acetate solution and allowed to react at 100° C. for 5 hours to obtain Non-linear polyester resin B-1 having a reactive group [Prepolymer B-1]. This resin was found to have a number average molecular weight (Mn) of 5,800, a weight average molecular weight (Mw) of 26,000, and a Tg of −5° C.

(Production of Crystalline Polyester Resin C)

<Synthesis of Crystalline Polyester Resin C-1>

A 5 L four-necked flask equipped with a nitrogen-introducing tube, a drain tube, a stirrer, and a thermocouple was charged with sebacic acid and 1,6-hexanediol so that a molar ratio of hydroxyl groups to carboxyl groups (OH/COOH) was 0.9. The resultant mixture was allowed to react with titanium tetraisopropoxide (500 ppm relative to the resin components) at 180° C. for 10 hours, was heated to 200° C., was allowed to react for 3 hours, and then was allowed to further react at a pressure of 8.3 kPa for 2 hours to obtain Crystalline polyester resin C-1. Physical properties of the Crystalline polyester resin C-1 are presented in Tables 1-1 to 1-4.

Example 1

<Preparation of Masterbatch (Mb)>

Water (1,200 parts), 500 parts of carbon black (PRINTEX 35, available from Evonik Degussa Japan Co., Ltd.) [DBP oil absorption amount=42 mL/100 mg, pH=9.5], and 500 parts of the First polyester resin A-1 were added and mixed together by means of HENSCHEL MIXER (available from NIPPON COLE & ENGINEERING CO., LTD.). The resultant mixture was kneaded by means of a two-roll mill at 150° C. for 30 min. The resultant kneaded product was cooled by rolling and then pulverized by a pulverizer to obtain [Masterbatch 1].

<Synthesis of WAX Dispersing Agent>

An autoclave reaction tank equipped with a thermometer and a stirrer was charged with 480 parts of xylene and 100 parts of a low-molecular-weight polyethylene (SAN WAX 151P, available from Sanyo Chemical Industries, Ltd., melting point: 108° C., and weight average molecular weight: 1,000). The resultant was thoroughly dissolved and purged with nitrogen. A mixed solution of 805 parts of styrene, 50 parts of acrylonitrile, 45 parts of butyl acrylate, 36 parts of di-t-butyl peroxide, and 100 parts of xylene was added dropwise to the resultant at 170° C. for 3 hours to be allowed to polymerize. The resultant was maintained at this temperature for 30 min and desolvated to obtain a [WAX dispersing agent].

The acrylic resin in the WAX dispersing agent was found to have a weight average molecular weight of 16,000.

The WAX dispersing agent was found to have a weight average molecular weight of 18,000, a number average molecular weight of 3,300, and a Tg of 65° C.

<Preparation of WAX Dispersion Liquid>

A vessel to which a stirring bar and a thermometer had been set was charged with 300 parts of paraffin wax (HNP-9, available from Nippon Seiro Co., Ltd., hydrocarbon wax, and melting point: 75° C.) serving as a release agent, 150 parts of the [WAX dispersing agent], and 1,800 parts of ethyl acetate. The resultant was heated to 80° C. with stirring, maintained at 80° C. for 5 hours, and cooled to 30° C. for 1 hour. The resultant was dispersed by means of a bead mill (ULTRA VISCOMILL, available from AIMEX CO., Ltd.) under the following conditions: a liquid feed rate of 1 kg/hr, a disc circumferential velocity of 6 m/s, zirconia beads having a diameter of 0.5 mm packed to 80% by volume, and 3 passes, to obtain [WAX dispersion liquid 1].

<Preparation of Crystalline-Polyester-Resin Dispersion Liquid>

A vessel to which a stirring bar and a thermometer had been set was charged with 308 parts of the Crystalline polyester resin C-1 and 1,900 parts of ethyl acetate. The resultant was heated to 80° C. with stirring, maintained at 80° C. for 5 hours, and cooled to 30° C. for 1 hour. The resultant was dispersed by means of a bead mill (ULTRA VISCOMILL, available from AIMEX CO., Ltd.) under the following conditions: a liquid feed rate of 1 kg/hr, a disc circumferential velocity of 6 m/s, zirconia beads having a diameter of 0.5 mm packed to 80% by volume, and 3 passes, to obtain [Crystalline-polyester-resin dispersion liquid 1].

<Preparation of Oil Phase>

A vessel was charged with 190 parts of the [WAX dispersion liquid 1], 32 parts of [Prepolymer B-1], 290 parts of the [Crystalline-polyester-resin dispersion liquid 1], 65 parts of the [First polyester resin A-1], 100 parts of the [Masterbatch 1], and 0.2 parts of the [Ketimine compound 1]. The resultant mixture was mixed by means of a TK Homomixer (available from PRIMIX Corporation) at 7,000 rpm for 60 min to obtain [Oil phase 1].

<Synthesis of Organic Particle Emulsion (Particle Dispersion Liquid)>

A reaction vessel to which a stirring bar and a thermometer had been set was charged with 683 parts of water, 11 parts of a sodium salt of sulfuric acid ester of methacrylic acid-ethylene oxide adduct (ELEMINOL RS-30, available from Sanyo Chemical Industries, Ltd.), 138 parts of styrene, 138 parts of methacrylic acid, and 1 part of ammonium persulfate. The resultant was stirred at 400 rpm for 15 min to obtain a white emulsion. The resultant emulsion was heated until a system temperature would become 75° C. and was then allowed to react for 5 hours. Thirty parts of a 1% aqueous ammonium persulfate solution was added to the resultant and then aged at 75° C. for 5 hours to obtain [Particle dispersion liquid 1; i.e., an aqueous dispersion liquid of a vinyl resin (a copolymer of styrene/methacrylic acid/sodium salt of sulfuric acid ester of methacrylic acid ethylene oxide adduct).

The [Particle dispersion liquid 1] was found to have a volume average particle diameter of 0.14 μm as measured by means of LA-920 (available from HORIBA, Ltd.). Part of the [Particle dispersion liquid 1] was dried and resin components were isolated therefrom.

<Preparation of Aqueous Phase>

Water (990 parts), 83 parts of the [Particle dispersion liquid 1], 37 parts of a 48.5% aqueous solution of sodium dodecyl diphenyl ether disulfonate (ELEMINOL MON-7, available from Sanyo Chemical Industries Ltd.), and 90 parts of ethyl acetate were mixed and stirred to obtain a milky white liquid, which was used as [Aqueous phase 1].

<Emulsification and Desolvation>

The [Aqueous phase 1] (1,200 parts) was added to a vessel containing the [Oil phase 1]. The resultant mixture was mixed by means of a TK Homomixer at 8,000 rpm for 20 min to obtain [Emulsified slurry 1].

A vessel to which a stirring bar and a thermometer had been set was charged with the [Emulsified slurry 1], desolvated at 30° C. for 8 hours, and then aged at 45° C. for 4 hours to obtain [Dispersion slurry 1].

<Washing and Drying>

One hundred parts of the [Dispersion slurry 1] was filtrated under reduced pressure, and then the resultant was subjected twice to a series of procedures (1) to (4) described below to obtain [Filtration cake 1]:

(1): 100 parts of ion-exchanged water was added to the resultant filtration cake, mixed with a TK Homomixer (at 12,000 rpm for 10 min), and then filtrated;

(2): 100 parts of a 10% aqueous sodium hydroxide solution was added to the filtration cake obtained in (1), mixed with the TK Homomixer (at 12,000 rpm for 30 min), and then filtrated under reduced pressure;

(3): 100 parts of 10% hydrochloric acid was added to the filtration cake obtained in (2), mixed with the TK Homomixer (at 12,000 rpm for 10 min), and then filtrated; and (4); 300 parts of ion-exchanged water was added to the filtration cake obtained in (3), mixed with the TK Homomixer (at 12,000 rpm for 10 min), and then filtrated.

The [Filtration cake 1] was dried with an air-circulating drier at 45° C. for 48 hours, and then was sieved through a 75-μm mesh to prepare [Toner 1].

A component ratio and a physical property of the resultant toner are presented in Table 1-1.

Example 2

[Toner 2] was obtained in the same manner as in Example 1, except that an oil phase was prepared so as to have a material composition and a component ratio presented in Table 1-1.

Example 3

[Toner 3] was obtained in the same manner as in Example 1, except that an oil phase was prepared so as to have a material composition and a component ratio presented in Table 1-1.

Example 4

[Toner 4] was obtained in the same manner as in Example 1, except that an oil phase was prepared so as to have a material composition and a component ratio presented in Table 1-1.

Example 5

[Toner 5] was obtained in the same manner as in Example 1, except that an oil phase was prepared so as to have a material composition and a component ratio presented in Table 1-1.

Example 6

[Toner 6] was obtained in the same manner as in Example 1, except that an oil phase was prepared so as to have a material composition and a component ratio presented in Table 1-2.

Example 6

[Toner 6] was obtained in the same manner as in Example 1, except that an oil phase was prepared so as to have a material composition and a component ratio presented in Table 1-2.

Example 7

[Toner 7] was obtained in the same manner as in Example 1, except that an oil phase was prepared so as to have a material composition and a component ratio presented in Table 1-2.

Example 8

[Toner 8] was obtained in the same manner as in Example 1, except that an oil phase was prepared so as to have a material composition and a component ratio presented in Table 1-2.

Example 9

[Toner 9] was obtained in the same manner as in Example 1, except that an oil phase was prepared so as to have a material composition and a component ratio presented in Table 1-2.

Example 10

[Toner 10] was obtained in the same manner as in Example 1, except that an oil phase was prepared so as to have a material composition and a component ratio presented in Table 1-2.

Example 11

[Toner 11] was obtained in the same manner as in Example 1, except that an oil phase was prepared so as to have a material composition and a component ratio presented in Table 1-3.

Comparative Example 1

[Toner 12] was obtained in the same manner as in Example 1, except that an oil phase was prepared so as to have a material composition and a component ratio presented in Table 1-3.

Comparative Example 2

[Toner 13] was obtained in the same manner as in Example 1, except that an oil phase was prepared so as to have a material composition and a component ratio presented in Table 1-3.

Comparative Example 3

[Toner 14] was obtained in the same manner as in Example 1, except that an oil phase was prepared so as to have a material composition and a component ratio presented in Table 1-3.

Comparative Example 4

[Toner 15] was obtained in the same manner as in Example 1, except that an oil phase was prepared so as to have a material composition and a component ratio presented in Table 1-3.

Comparative Example 5

[Toner 16] was obtained in the same manner as in Example 1, except that an oil phase was prepared so as to have a material composition and a component ratio presented in Table 1-4.

Comparative Example 6

[Toner 17] was obtained in the same manner as in Example 1, except that an oil phase was prepared so as to have a material composition and a component ratio presented in Table 1-4.

Comparative Example 7

[Toner 18] was obtained in the same manner as in Example 1, except that an oil phase was prepared so as to have a material composition and a component ratio presented in Table 1-4.

Comparative Example 8

[Toner 19] was obtained in the same manner as in Example 1, except that an oil phase was prepared so as to have a material composition and a component ratio presented in Table 1-4.

<Evaluation>

Developers were produced from the resultant toners by the following method and were subjected to the following evaluation. Results are presented in Tables 1-1 to 1-4.

<<Developer>>

—Production of Carrier—

One hundred parts of a silicone resin (organo straight silicone), 5 parts of γ-(2-aminoethyl)aminopropyltrimethoxy silane, and 10 parts of carbon black were added to 100 parts of toluene and then dispersed by means of a homomixer for 20 min to prepare a resin-layer-coating liquid. The resin-layer-coating liquid was coated onto surfaces of spherical magnetite particles having an average particle diameter of 50 μm (1,000 parts) by means of a fluidized-bed coating device to prepare a carrier.

—Production of Developer—

Each (5 parts) of the toners and the carrier (95 parts) were mixed by means of a ball mill to produce Developers Nos. 1 to 19 corresponding to Toners Nos. 1 to 11 for Examples and Toners Nos. 12 to 19 for Comparative Examples.

<<Low-Temperature Fixing Ability and Hot Offset Resistance>>

A modified apparatus obtained by modifying a fixing portion of a copier, IMAGIO MF2200 (available from Ricoh Company, Ltd.) employing a TEFLON (registered trademark) roller as a fixing roller was used to perform a copying test on sheets of Type 6200 paper (available from Ricoh Company, Ltd.).

Specifically, fixing was performed with varying temperatures to determine a cold offset temperature (fixing lower-limit temperature) and a hot offset temperature (fixing upper-limit temperature).

Determination of the fixing lower-limit temperature was performed under the following conditions: a paper-feeding linear velocity: from 120 mm/sec through 150 mm/sec; a surface pressure: 1.2 kgf/cm$^2$; and a nip width: 3 mm.

Determination of the fixing upper-limit temperature was performed under the following conditions: a paper-feeding linear velocity: 50 mm/sec; a surface pressure: 2.0 kgf/cm$^2$; and a nip width: 4.5 mm.

<<Glossiness>>

A modified apparatus obtained by modifying a fixing portion of a copier, MF2200 (available from Ricoh Company, Ltd.) employing a TEFLON (registered trademark) roller as a fixing roller was used to perform a copying test on sheets of Type 6200 paper (available from Ricoh Company, Ltd.). Specifically, the fixing temperature was set to a temperature higher by 20° C. than the fixing lower-limit temperature determined in the evaluation of the low-temperature fixing ability, and the paper-feeding linear velocity was set to be from 120 mm/sec through 150 mm/sec, the surface pressure was set to 1.2 kgf/cm$^2$, and the nip width was set to 3 mm. Images obtained in the copying test were measured for 60-degree glossiness by a glossmeter VG-7000 (available from NIPPON DENSHOKU INDUSTRIES Co., Ltd.) and evaluated according to the following evaluation criteria.

[Evaluation Criteria]
A: 30% or more
B: 25% or more but less than 30%
C: 20% or more but less than 25%
D: less than 20%

<<Heat-Resistant Storage Stability>>

Each of the toners was stored at 50° C. for 8 hours and then sieved through a 42-mesh sieve for 2 min. A residual rate of the toner remaining on a metal mesh was measured. The better the heat-resistant storage stability of the toner is, the lower the residual rate is.

Note that, the heat-resistant storage stability was evaluated according to the following evaluation criteria.

[Evaluation Criteria]
A: The residual rate was lower than 10%.
B: The residual rate was 10% or higher but lower than 20%.
C: The residual rate was 20% or higher but lower than 30%.
D: The residual rate was 30% or higher.

<<High-Temperature, High-Humidity Resistant Storage Stability>>

Each (5 g) of the toners was stored under an environment of 40° C. and 70% for 2 weeks and then sieved through a 106

µm-mesh sieve for 5 min. An amount of the toner remaining on a metal mesh was weighed and evaluated according to the following evaluation criteria.
[Evaluation Criteria]
A: The amount of the toner remaining on the metal mesh was 0 mg.
B: The amount of the toner remaining on the metal mesh was more than 0 mg but less than 2 mg.
C: The amount of the toner remaining on the metal mesh was 2 mg or more but less than 50 mg.
D: The amount of the toner remaining on the metal mesh was 50 mg or more.

<<White Voids after Transfer>>

Each of the Developers Nos. 1 to 19 was mounted in IMAGIO MP C2802 (available from Ricoh Company, Ltd.), and an A4-size image having an image area ratio of 5% was continuously printed on 10,000 sheets of paper. After the completion of this test, a whole solid image (toner deposition amount: 0.4 mg/cm$^2$) was printed on three sheets of A4-size paper, and the number of white voids in the images was visually measured.

The total number of the white voids in the images on the three sheets was ranked according to the following criteria.
A: No white voids were visually recognized in the images on the three sheets.
B: White voids were observed in the image on the third sheet under an optical microscope, but were not at a problematic level in practical use.
C: A total of from 1 through 10 white voids were visually recognized in the images on the three sheets, and were at a problematic level in practical use.
D: A total of more than 10 white voids were visually recognized in the images on the three sheets, and were at a significantly problematic level in practical use.

<<Blocking Resistance of Image>>

A modified apparatus obtained by modifying a fixing portion of a copier, MF2200 (available from Ricoh Company, Ltd.) employing a TEFLON (registered trademark) roller as a fixing roller was used to perform a copying test on sheets of Type 6200 paper (available from Ricoh Company, Ltd.). Specifically, the fixing temperature was set to a temperature higher by 20° C. than the fixing lower-limit temperature determined in the evaluation of the low-temperature fixing ability, and the paper-feeding linear velocity was set to be from 120 mm/sec through 150 mm/sec, the surface pressure was set to 1.2 kgf/cm$^2$, and the nip width was set to 3 mm. The resultant fixed image was superposed on a sheet of blank paper and then sandwiched by metal plates. A load was applied to the resultant laminate so that a pressure of 10 kPa was applied and then stored at 50° C. for 24 hours. Then, the image was peeled from the sheet of blank paper to evaluate blocking resistance.

Note that, the blocking resistance was evaluated according to the following criteria.
[Evaluation Criteria]
A: The image was not exfoliated at all, and sound was not made upon peeling.
B: The image was not exfoliated, but sound was made upon peeling.
C: The image was adhered to the sheet of blank paper, and a small part of the image was lost upon peeling.
D: The image was adhered to the sheet of blank paper, and a large part of the image was lost upon peeling.

TABLE 1-1

| | | Ex. 1 | Ex. 2 | Ex. 3 | Ex. 4 | Ex. 5 |
|---|---|---|---|---|---|---|
| Toner No. | | 1 | 2 | 3 | 4 | 5 |
| First polyester resin A | Kind | A-1 | A-1 | A-2 | A-3 | A-4 |
| | Dicarboxylic acid | Terephthalic Acid 85%/Adipic Acid 15% | Terephthalic Acid 85%/Adipic Acid 15% | Terephthalic Acid 55%/Adipic Acid 45% | Terephthalic Acid 55%/Adipic Acid 45% | Terephthalic Acid 30%/Adipic Acid 70% |
| | Diol | BisA-EO 40%/BisA-PO 60% | BisA-EO 40%/BisA-PO 60% | BisA-EO 40%/BisA-PO 60% | BisA-EO 40%/BisA-PO 60% | BisA-EO 40%/BisA-PO 60% |
| | Kind of branched component | TMP | TMP | TMP | Sorbitol | TMP |
| | Amount of branched component | 3.5 | 3.5 | 3.5 | 6 | 3.5 |
| | OH/COOH | 1.12 | 1.12 | 1.04 | 1.06 | 1.06 |
| | Tg (° C.) | 61 | 61 | 43 | 40 | 30 |
| | Mw | 13,000 | 13,000 | 21,000 | 18,000 | 18,000 |
| | Interbranch distance | 1,238 | 1,238 | 2,000 | 500 | 1,714 |
| Prepolymer B | Kind | B-1 | — | — | — | — |
| | Dicarboxylic acid | Adipic acid 50%/ Terephthalic acid 50% | — | — | — | — |
| | Polyol | 3-Methyl1,5-pentanediol 97%/TMP 3% | — | — | — | — |
| | OH/COOH | 1.1 | — | — | — | — |
| | Tg (° C.) | −5 | — | — | — | — |
| | Mw | 26,000 | — | — | — | — |
| Crystalline polyester resin C | Kind | C-1 | C-1 | C-1 | C-1 | C-1 |
| | Dicarboxylic acid | Sebacic acid 100% | Sebacic acid 100% | Sebacic acid 100% | Sebacic acid 100% | Sebacic acid 100% |
| | Diol | Hexanediol 100% | Hexanediol 100% | Hexanediol 100% | Hexanediol 100% | Hexanediol 100% |
| | OH/COOH | 0.90 | 0.90 | 0.90 | 0.90 | 0.90 |
| | Tm (° C.) | 67 | 67 | 67 | 67 | 67 |
| | Mw | 25,000 | 25,000 | 25,000 | 25,000 | 25,000 |

TABLE 1-1-continued

|  |  | Ex. 1 | Ex. 2 | Ex. 3 | Ex. 4 | Ex. 5 |
|---|---|---|---|---|---|---|
| Component ratio (% by mass) | First polyester resin A | 58 | 74 | 74 | 74 | 74 |
|  | Second polyester resin B | 16 | 0 | 0 | 0 | 0 |
|  | Crystalline polyester resin C | 14 | 14 | 14 | 14 | 14 |
|  | Release agent | 6 | 6 | 6 | 6 | 6 |
|  | Colorant | 6 | 6 | 6 | 6 | 6 |
| Physical property of toner | Tg1st of toner (° C.) | 40 | 55 | 35 | 32 | 22 |
| Quality of toner | Fixability Fixing lower limit (° C.) | 100 | 115 | 105 | 105 | 100 |
|  | Fixing upper limit (° C.) | 200 | 175 | 200 | 190 | 185 |
|  | Image gloss | A | A | B | B | B |
|  | Heat-resistant storage stability | A | A | A | A | B |
|  | High-temperature, high-humidity resistant storage stability | A | A | A | B | B |
|  | White voids after transfer | A | A | A | B | B |
|  | Blocking resistance of image | A | A | B | B | A |

TABLE 1-2

|  |  | Ex. 6 | Ex. 7 | Ex. 8 | Ex. 9 | Ex. 10 |
|---|---|---|---|---|---|---|
| Toner No. |  | 6 | 7 | 8 | 9 | 10 |
| First polyester resin A | Kind | A-5 | A-6 | A-7 | A-8 | A-9 |
|  | Dicarboxylic acid | Terephthalic acid 85%/Adipic acid 15% | Terephthalic acid 95%/Adipic acid 5% | Terephthalic acid 85%/Adipic acid 15% | Terephthalic acid 85%/Adipic acid 15% | Terephthalic acid 85%/Adipic acid 15% |
|  | Diol | BisA-EO 40%/BisA-PO 60% | BisA-EO 40%/BisA-PO 60% | BisA-EO 40%/BisA-PO 60% | BisA-EO 40%/BisA-PO 60% | BisA-EO 40%/BisA-PO 60% |
|  | Kind of branched component | TMP | TMP | TMP | TMP | Pentaerythritol |
|  | Amount of branched component | 3.5 | 3.5 | 3.5 | 5.0 | 3.5 |
|  | OH/COOH | 1.06 | 1.2 | 1.04 | 1.12 | 1.12 |
|  | Tg (° C.) | 65 | 61 | 70 | 63 | 61 |
|  | Mw | 18,000 | 7,500 | 21,000 | 13,000 | 13,000 |
|  | Interbranch distance | 1,714 | 714 | 2,000 | 867 | 929 |
| Prepolymer B | Kind | — | B-1 | B-1 | B-1 | B-1 |
|  | Dicarboxylic acid | — | Adipic acid 50%/Terephthalic acid 50% | Adipic acid 50%/Terephthalic acid 50% | Adipic acid 50%/Terephthalic acid 50% | Adipic acid 50%/Terephthalic acid 50% |
|  | Polyol | — | 3-Methyl-1,5-pentanediol 97%/TMP 3% | 3-Methyl-1,5-pentanediol 97%/TMP 3% | 3-Methyl-1,5-pentanediol 97%/TMP 3% | 3-Methyl-1,5-pentanediol 97%/TMP 3% |
|  | OH/COOH | — | 1.1 | 1.1 | 1.1 | 1.1 |
|  | Tg (° C.) | — | −5 | −5 | −5 | −5 |
|  | Mw | — | 26,000 | 26,000 | 26,000 | 26,000 |
| Crystalline polyester resin C | Kind | C-1 | C-1 | C-1 | C-1 | C-1 |
|  | Dicarboxylic acid | Sebacic acid 100% | Sebacic acid 100% | Sebacic acid 100% | Sebacic acid 100% | Sebacic acid 100% |
|  | Diol | Hexanediol 100% | Hexanediol 100% | Hexanediol 100% | Hexanediol 100% | Hexanediol 100% |
|  | OH/COOH | 0.90 | 0.90 | 0.90 | 0.90 | 0.90 |
|  | Tm (° C.) | 67 | 67 | 67 | 67 | 67 |
|  | Mw | 25,000 | 25,000 | 25,000 | 25,000 | 25,000 |
| Component ratio (% by mass) | First polyester resin A | 74 | 58 | 58 | 58 | 58 |
|  | Second polyester resin B | 0 | 16 | 16 | 16 | 16 |
|  | Crystalline polyester resin C | 14 | 14 | 14 | 14 | 14 |
|  | Release agent | 6 | 6 | 6 | 6 | 6 |
|  | Colorant | 6 | 6 | 6 | 6 | 6 |
| Physical property of toner | Tg1st of toner (° C.) | 58 | 42 | 51 | 44 | 39 |

TABLE 1-2-continued

|  |  |  | Ex. 6 | Ex. 7 | Ex. 8 | Ex. 9 | Ex. 10 |
|---|---|---|---|---|---|---|---|
| Quality of toner | Fixability | Fixing lower limit (° C.) | 115 | 95 | 110 | 105 | 105 |
|  |  | Fixing upper limit (° C.) | 190 | 190 | 200 | 200 | 200 |
|  | Image gloss |  | B | A | B | B | B |
|  | Heat-resistant storage stability |  | A | A | A | A | A |
|  | High-temperature, high-humidity resistant storage stability |  | A | B | A | A | B |
|  | White voids after transfer |  | A | B | A | B | B |
|  | Blocking resistance of image |  | A | A | A | B | B |

TABLE 1-3

|  |  | Ex. 11 | Comp. Ex. 1 | Comp. Ex. 2 | Comp. Ex. 3 | Comp. Ex. 4 |
|---|---|---|---|---|---|---|
| Toner No. |  | 11 | 12 | 13 | 14 | 15 |
| First polyester resin A | Kind | A-10 | A-11 | A-12 | A-13 | A-14 |
|  | Dicarboxylic acid | Terephthalic acid 85%/Adipic acid 15% | Terephthalic acid 85%/Adipic acid 15% | Terephthalic acid 85%/Adipic acid 15% | Terephthalic acid 85%/Adipic acid 15% | Terephthalic acid 85%/Adipic acid 15% |
|  | Diol | BisA-EO 40%/BisA-PO 60% | BisA-EO 40%/BisA-PO 60% | BisA-EO 40%/BisA-PO 60% | BisA-EO 40%/BisA-PO 60% | BisA-EO 40%/BisA-PO 60% |
|  | Kind of branched component | Sorbitol | TMA | TMP | TMP | — |
|  | Amount of branched component | 3.5 | 3.5 | 0.5 | 7.0 | — |
|  | OH/COOH | 1.12 | 1.12 | 1.12 | 1.12 | 1.12 |
|  | Tg (° C.) | 61 | 62 | 59 | 62 | 61 |
|  | Mw | 13,000 | 13,000 | 13,000 | 13,000 | 13,000 |
|  | Interbranch distance | 619 | 1,238 | 8,667 | 619 | — |
| Prepolymer B | Kind | B-1 | B-1 | B-1 | B-1 | B-1 |
|  | Dicarboxylic acid | Adipic acid 50%/Terephthalic acid 50% | Adipic acid 50%/Terephthalic acid 50% | Adipic acid 50%/Terephthalic acid 50% | Adipic acid 50%/Terephthalic acid 50% | Adipic acid 50%/Terephthalic acid 50% |
|  | Polyol | 3-Methyl-1,5-pentanediol 97%/TMP 3% | 3-Methyl-1,5-pentanediol 97%/TMP 3% | 3-Methyl-1,5-pentanediol 97%/TMP 3% | 3-Methyl-1,5-pentanediol 97%/TMP 3% | 3-Methyl-1,5-pentanediol 97%/TMP 3% |
|  | OH/COOH | 1.1 | 1.1 | 1.1 | 1.1 | 1.1 |
|  | Tg (° C.) | −5 | −5 | −5 | −5 | −5 |
|  | Mw | 26,000 | 26,000 | 26,000 | 26,000 | 26,000 |
| Crystalline polyester resin C | Kind | C-1 | C-1 | C-1 | C-1 | C-1 |
|  | Dicarboxylic acid | Sebacic acid 100% | Sebacic acid 100% | Sebacic acid 100% | Sebacic acid 100% | Sebacic acid 100% |
|  | Diol | Hexanediol 100% | Hexanediol 100% | Hexanediol 100% | Hexanediol 100% | Hexanediol 100% |
|  | OH/COOH | 0.90 | 0.90 | 0.90 | 0.90 | 0.90 |
|  | Tm (° C.) | 67 | 67 | 67 | 67 | 67 |
|  | Mw | 25,000 | 25,000 | 25,000 | 25,000 | 25,000 |
| Component ratio (% by mass) | First polyester resin A | 58 | 58 | 58 | 58 | 58 |
|  | Second polyester resin B | 16 | 16 | 16 | 16 | 16 |
|  | Crystalline polyester resin C | 14 | 14 | 14 | 14 | 14 |
|  | Release agent | 6 | 6 | 6 | 6 | 6 |
|  | Colorant | 6 | 6 | 6 | 6 | 6 |
| Physical property of toner | Tg1st of toner (° C.) | 40 | 43 | 39 | 44 | 42 |
| Quality of toner | Fixability | Fixing lower limit (° C.) | 110 | 110 | 120 | 125 | 125 |
|  |  | Fixing upper limit (° C.) | 200 | 200 | 190 | 200 | 200 |
|  | Image gloss | B | C | A | D | A |
|  | Heat-resistant storage stability | B | C | A | C | A |
|  | High-temperature, high-humidity resistant storage stability | B | C | C | C | B |
|  | White voids after transfer | B | C | C | C | C |
|  | Blocking resistance of image | B | B | A | D | A |

TABLE 1-4

|  |  | Comp. Ex. 5 | Comp. Ex. 6 | Comp. Ex. 7 | Comp. Ex. 8 |
|---|---|---|---|---|---|
| Toner No. |  | 16 | 17 | 18 | 19 |
| First polyester resin A | Kind | A-15 | A-16 | A-17 | A-18 |
|  | Dicarboxylic acid | Terephthalic acid 100% | Terephthalic acid 50%/Adipic acid 50% | Terephthalic acid 95%/Adipic acid 5% | Terephthalic acid 85%/Adipic acid 15% |
|  | Diol | BisA-EO 40%/BisA-PO 60% | BisA-EO 40%/BisA-PO 60% | BisA-EO 40%/BisA-PO 60% | BisA-EO 40%/BisA-PO 60% |
|  | Kind of branched component | TMP | TMP | TMP | TMP |
|  | Amount of branched component | 0.6 | 3.5 | 0.4 | 6.0 |
|  | OH/COOH | 1.26 | 1.01 | 1.24 | 1.2 |
|  | Tg (° C.) | 55 | 61 | 56 | 61 |
|  | Mw | 3,500 | 26,000 | 4,500 | 7,500 |
|  | Interbranch distance | 1,944 | 2,476 | 3,750 | 417 |
| Prepolymer B | Kind | B-1 | B-1 | B-1 | B-1 |
|  | Dicarboxylic acid | Adipic acid 50%/Terephthalic acid 50% | Adipic acid 50%/Terephthalic acid 50% | Adipic acid 50%/Terephthalic acid 50% | Adipic acid 50%/Terephthalic acid 50% |
|  | Polyol | 3-Methyl-1,5-pentanediol 97%/TMP 3% | 3-Methyl-1,5-pentanediol 97%/TMP 3% | 3-Methyl-1,5-pentanediol 97%/TMP 3% | 3-Methyl-1,5-pentanediol 97%/TMP 3% |
|  | OH/COOH | 1.1 | 1.1 | 1.1 | 1.1 |
|  | Tg (° C.) | −5 | −5 | −5 | −5 |
|  | Mw | 26,000 | 26,000 | 26,000 | 26,000 |
| Crystalline polyester resin C | Kind | C-1 | C-1 | C-1 | C-1 |
|  | Dicarboxylic acid | Sebacic acid 100% | Sebacic acid 100% | Sebacic acid 100% | Sebacic acid 100% |
|  | Diol | Hexanediol 100% | Hexanediol 100% | Hexanediol 100% | Hexanediol 100% |
|  | OH/COOH | 0.90 | 0.90 | 0.90 | 0.90 |
|  | Tm (° C.) | 67 | 67 | 67 | 67 |
|  | Mw | 25,000 | 25,000 | 25,000 | 25,000 |
| Component ratio (% by mass) | First polyester resin A | 58 | 58 | 58 | 58 |
|  | Second polyester resin B | 16 | 16 | 16 | 16 |
|  | Crystalline polyester resin C | 14 | 14 | 14 | 14 |
|  | Release agent | 6 | 6 | 6 | 6 |
|  | Colorant | 6 | 6 | 6 | 6 |
| Physical property of toner | Tg1st of toner (° C.) | 41 | 41 | 42 | 41 |
| Quality of toner | Fixability  Fixing lower limit (° C.) | 120 | 130 | 120 | 100 |
|  | Fixing upper limit (° C.) | 175 | 200 | 180 | 200 |
|  | Image gloss | A | D | A | A |
|  | Heat-resistant storage stability | B | A | B | B |
|  | High-temperature, high-humidity resistant storage stability | C | A | C | C |
|  | White voids after transfer | D | A | C | D |
|  | Blocking resistance of image | B | A | A | C |

In Tables 1-1 to 1-4, "Component ratio (% by mass)" denotes a component ratio (% by mass) relative to the total amount of the first polyester resin, the second polyester resin B, the crystalline polyester resin C, the release agent, and the colorant.

"BisA-EO" denotes bisphenol A ethylene oxide 2 mol adduct.

"BisA-PO" denotes bisphenol A propylene oxide 3 mol adduct.

"TMP" denotes trimethylolpropane and "TMA" denotes trimellitic acid.

Aspects of the present invention are, for example, as follows.

<1> A polyester resin for a toner, the polyester resin including:
a segment derived from an alcohol component; and
a segment derived from a carboxylic acid component,
wherein the alcohol component includes a trivalent or higher aliphatic alcohol, and
wherein the polyester resin satisfies Expressions (1) to (3) below:

$$500 \leq \frac{\text{Weight average molecular weight } (Mw)}{\begin{pmatrix} \text{Valence of the trivalent or} \\ \text{higher aliphatic alcohol} \end{pmatrix} \times \begin{pmatrix} \text{Amount of the trivalent or} \\ \text{higher aliphatic alcohol} \end{pmatrix}} \leq 4,000; \quad \text{Expression (1)}$$

$$4,000 \leq \text{Weight average molecular weight } (Mw) \leq 25,000 \quad \text{Expression (2); and}$$

$$0.5 \leq (\text{Amount of the trivalent or higher aliphatic alcohol}) \leq 6.5 \quad \text{Expression (3),}$$

where, in the Expressions (1) and (3), the Amount of the trivalent or higher aliphatic alcohol denotes a percent by mole of the trivalent or higher aliphatic alcohol relative to the alcohol component.

<2> The polyester resin for a toner according to <1>,
wherein the polyester resin satisfies Expression (1-1) below:

$$800 \leq \frac{\text{Weight average molecular weight } (Mw)}{\begin{pmatrix}\text{Valence of the trivalent or}\\ \text{higher aliphatic alcohol}\end{pmatrix} \times \begin{pmatrix}\text{Amount of the trivalent or}\\ \text{higher aliphatic alcohol}\end{pmatrix}} \leq 2{,}000 \quad \text{Expression (1-1)}$$

where, in the Expression (1-1), the Amount of the trivalent or higher aliphatic alcohol denotes a percent by mole of the trivalent or higher aliphatic alcohol relative to the alcohol component.

<3> The polyester resin for a toner according to <1> or <2>, wherein the trivalent or higher aliphatic alcohol is a trivalent or tetravalent aliphatic alcohol.

<4> The polyester resin for a toner according to any one of <1> to <3>,
wherein the polyester resin satisfies Expression (3-1) below:

$$2.0 \leq (\text{Amount of the trivalent or higher aliphatic alcohol}) \leq 4.0 \quad \text{Expression (3-1)}$$

where, in the Expression (3-1), the Amount of the trivalent or higher aliphatic alcohol denotes a percent by mole of the trivalent or higher aliphatic alcohol relative to the alcohol component.

<5> the Polyester Resin for a Toner According to any One of <1> to <4>,
wherein the polyester resin satisfies Expression (2-1) below:

$$8{,}000 \leq \text{Weight average molecular weight } (Mw) \leq 20{,}000 \quad \text{Expression (2-1).}$$

<6> a Toner Including
the polyester resin for a toner according to any one of <1> to <5>.

<7> the Toner According to <6>,
wherein the toner has glass transition temperature [Tg1st (toner)] of 20° C. or more but 50° C. or less, the glass transition temperature [Tg1st (toner)] being a glass transition temperature at first heating in differential scanning calorimetry (DSC).

<8> The toner according to <6> or <7>,
wherein the toner has glass transition temperature [Tg2nd (toner)] of 5° C. or more but 35° C. or less, the glass transition temperature [Tg2nd (toner)] being a glass transition temperature at second heating in differential scanning calorimetry (DSC).

<9> The toner according to any one of <6> to <8>,
wherein the toner includes a tetrahydrofuran (THF) insoluble matter,
wherein the THF insoluble matter includes a second polyester resin,
wherein components constituting the second polyester resin include a diol component and a cross-linking component,
wherein the diol component includes 50 mol % or more of an aliphatic diol having from 3 through 10 carbon atoms, and wherein the cross-linking component includes the trivalent or higher aliphatic alcohol.

<10> The toner according to <9>,
wherein the second polyester resin includes at least one of a urethane bond and a urea bond.

<11> A developer including:
the toner according to any one of <6> to <10>; and a carrier.

<12> An image forming apparatus including:
an electrostatic latent image bearer;
an electrostatic-latent-image-forming means configured to form an electrostatic latent image on the electrostatic latent image bearer; and
a developing means including a toner and configured to develop the electrostatic latent image formed on the electrostatic latent image bearer to form a visible image,
wherein the toner is the toner according to any one of <6> to <10>.

DESCRIPTION OF THE REFERENCE NUMERAL 10 electrostatic latent image bearer
21 exposure device
25 fixing device
61 developing device
160 charging device

The invention claimed is:
1. A polyester resin for a toner, the polyester resin comprising:
a segment derived from an alcohol component; and
a segment derived from a carboxylic acid component,
wherein the alcohol component comprises a trivalent or higher aliphatic alcohol, and
wherein the polyester resin satisfies Expressions (1) to (3) below:

$$500 \leq \frac{\text{Weight average molecular weight } (Mw)}{\begin{pmatrix}\text{Valence of the trivalent or}\\ \text{higher aliphatic alcohol}\end{pmatrix} \times \begin{pmatrix}\text{Amount of the trivalent or}\\ \text{higher aliphatic alcohol}\end{pmatrix}} \leq 4{,}000; \quad \text{Expression (1)}$$

$$4{,}000 < \text{weight average molecular weight } (Mw) < 25{,}000 \quad \text{Expression (2);}$$

and $$0.5 \leq (\text{amount of the trivalent or higher aliphatic alcohol}) \leq 6.5 \quad \text{Expression (3),}$$

where, in the Expressions (1) and (3), the amount of the trivalent or higher aliphatic alcohol denotes a percent by mole of the trivalent or higher aliphatic alcohol relative to the alcohol component.

2. The polyester resin according to claim 1,
wherein the polyester resin satisfies Expression (1-1) below:

$$800 \leq \frac{\text{Weight average molecular weight } (Mw)}{\begin{pmatrix}\text{Valence of the trivalent or}\\ \text{higher aliphatic alcohol}\end{pmatrix} \times \begin{pmatrix}\text{Amount of the trivalent or}\\ \text{higher aliphatic alcohol}\end{pmatrix}} \leq 2{,}000 \quad \text{Expression (1-1)}$$

where, in the Expression (1-1), the amount of the trivalent or higher aliphatic alcohol denotes a percent by mole of the trivalent or higher aliphatic alcohol relative to the alcohol component.

3. The polyester resin according to claim 1, wherein the trivalent or higher aliphatic alcohol is a trivalent or tetravalent aliphatic alcohol.

4. The polyester resin according to claim 1, wherein the polyester resin satisfies Expression (3-1) below:

$$2.0 \leq \text{(amount of the trivalent or higher aliphatic alcohol)} \leq 4.0 \quad \text{Expression (3-1)}$$

where, in the Expression (3-1), the amount of the trivalent or higher aliphatic alcohol denotes a percent by mole of the trivalent or higher aliphatic alcohol relative to the alcohol component.

5. The polyester resin according to claim 1, wherein the polyester resin satisfies Expression (2-1) below:

$$8{,}000 \leq \text{Weight average molecular weight (Mw)} \leq 20{,}000 \quad \text{Expression (2-1)}.$$

6. A toner, comprising the polyester resin according to claim 1.

7. The toner according to claim 6, wherein the toner has glass transition temperature [Tg1st (toner)] of 20° C. or more but 50° C. or less, the glass transition temperature [Tg1st (toner)] being a glass transition temperature at first heating in differential scanning calorimetry (DSC).

8. The toner according to claim 6, wherein the toner has glass transition temperature [Tg2nd (toner)] of 5° C. or more but 35° C. or less, the glass transition temperature [Tg2nd (toner)] being a glass transition temperature at second heating in differential scanning calorimetry (DSC).

9. The toner according to claim 6,
wherein the toner comprises a tetrahydrofuran (THF) insoluble matter,
wherein the THF insoluble matter comprises a second polyester resin,
wherein components constituting the second polyester resin comprise a diol component and a cross-linking component,
wherein the diol component comprises 50 mol % or more of an aliphatic diol having from 3 through 10 carbon atoms, and
wherein the cross-linking component comprises the trivalent or higher aliphatic alcohol.

10. The toner according to claim 9, wherein the second polyester resin comprises at least one of a urethane bond and a urea bond.

11. A developer comprising:
the toner according to claim 6; and
a carrier.

12. An image forming apparatus comprising:
an electrostatic latent image bearer;
an electrostatic-latent-image-forming means configured to form an electrostatic latent image on the electrostatic latent image bearer; and
a developing means comprising a toner and configured to develop the electrostatic latent image formed on the electrostatic latent image bearer to form a visible image,
wherein the toner is the toner according to claim 6.

* * * * *